United States Patent [19]

van der Lely et al.

[11] 4,456,039

[45] Jun. 26, 1984

[54] DEVICE FOR TRANSPORTING AND/OR SPREADING LIQUIDS

[75] Inventors: Ary van der Lely, Maasland; Cornelis J. G. Bom, Rozenburg, both of Netherlands

[73] Assignee: C. Van der Lely N.V., Maasland, Netherlands

[21] Appl. No.: 333,334

[22] Filed: Dec. 22, 1981

[30] Foreign Application Priority Data

Dec. 23, 1980 [NL] Netherlands .................... 8007000
Mar. 9, 1981 [NL] Netherlands .................... 8101110
Jul. 15, 1981 [NL] Netherlands .................... 8103354

[51] Int. Cl.³ .................... B65B 3/04; B05B 9/00
[52] U.S. Cl. .................... 141/98; 141/231; 141/346; 239/148
[58] Field of Search .................... 141/2, 3, 18–29, 141/65, 67, 231–233, 98, 84, 250–284, 285–310, 346–362, 382–392; 239/148, 390

[56] References Cited

U.S. PATENT DOCUMENTS

| | | | |
|---|---|---|---|
| 3,136,485 | 6/1964 | Bellows et al. | 239/148 |
| 3,534,888 | 10/1970 | MacKinnon | 239/148 |
| 3,858,761 | 1/1975 | O'Dell | 239/148 |
| 4,244,522 | 1/1981 | Hartig | 239/148 |

*Primary Examiner*—Houston S. Bell, Jr.
*Attorney, Agent, or Firm*—Penrose Lucas Albright

[57] ABSTRACT

A tank for transporting and/or spreading fluids has a conduit at its rear and an air/vacuum source for moving fluids into and out of the hopper. The conduit terminates in a rear opening which may be an outlet or inlet and has a gate valve located between the outlet and tank. A coupling linkage system mounted on the conduit near the valve is capable of articulation to position either a fluid supply connection or a fluid distributor connection on the conduit opening. The linkage system causes the valve to be sequentially opened and shut responsive to the connection of the fluid supply and the fluid distributor. In one variation, the coupling linkage is pivoted to fasten either a supply pipe or the distributor to the conduit opening by a hydraulic ram. Thereafter, pressure is increased further to articulate the linkage and open the valve. The hydraulic system may also include another piston and cylinder to operate the valve. Also, the two piston and cylinder units in hydraulic communication via ducts and one-way valves may actuate the first piston and cylinder to a limit to pivot the linkage and connect or disconnect the supply pipe connector or distributor to or from the conduit opening, before the second piston and cylinder is actuated by a resulting decrease or increase in hydraulic fluid pressure to open or close the valve. Visual indicators assist an operator to maneuver the tanks to its supply connection and thereafter indicate the opened or closed condition of the valve and whether there is a supply connection or distributor connection at the conduit opening. Also, wheel guides position the tank and ground supports and secure the supply pipe in position.

68 Claims, 30 Drawing Figures

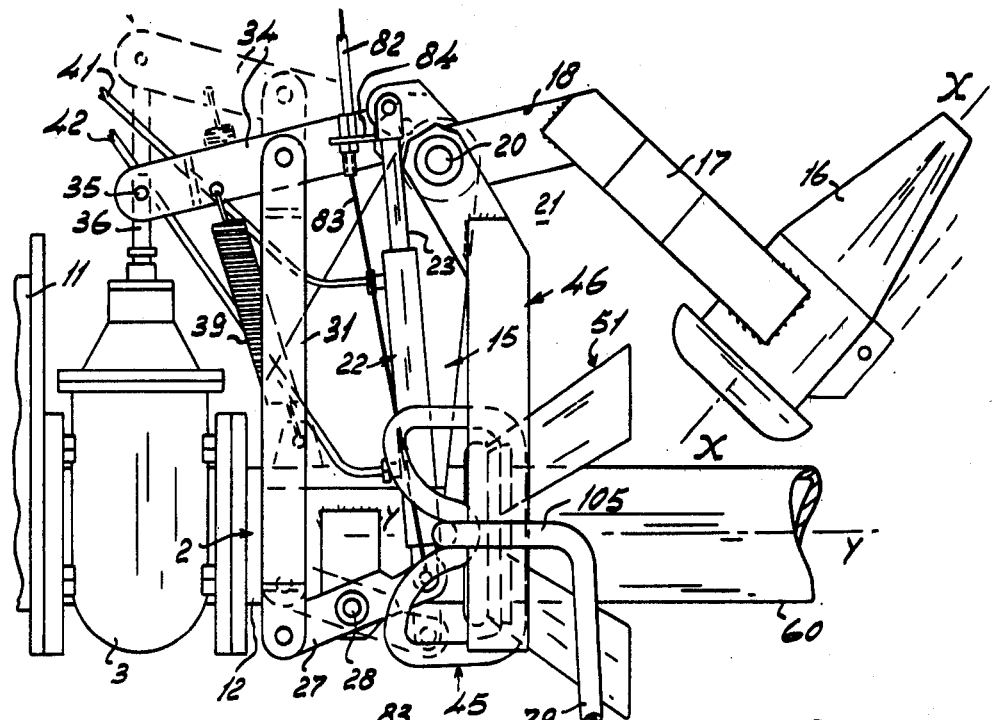
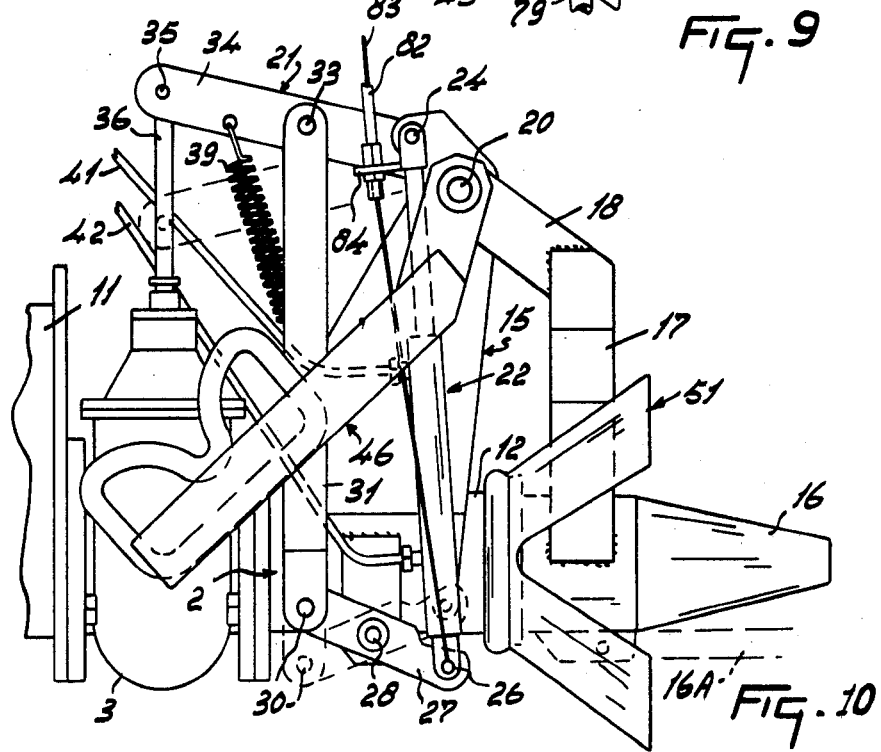
FIG. 9
FIG. 10

DEVICE FOR TRANSPORTING AND/OR SPREADING LIQUIDS

SUMMARY OF THE INVENTION

The invention relates to a device for transporting and/or spreading fluids comprising a hopper having an inlet and an outlet and a closing member located between the inlet or outlet respectively and the hopper, said device having a coupling device by means of which a feeding conduit can be connected with the inlet, and/or having a discharge means to be coupled with the outlet.

One object of the invention is to provide a robust and simply controllable device of the kind set forth. According to the invention this can be achieved by providing the device with operating means which, subsequent to energization, actuates either the coupling device or the discharge means, so that the feeding conduit is automatically pressed against the inlet or, respectively the discharge means is automatically pressed against the outlet of the hopper or which actuates in order of succession either the coupling device or the discharge means so that the feeding conduit is automatically pressed against the inlet or, respectively, the discharge means is automatically pressed against the outlet of the hopper and which subsequently actuates the closing member so that it is opened, while after the use of the device the operating means can again actuate the coupling device or the discharge means so that either the coupling device automatically disengages the feeding conduit and/or the discharge means is automatically removed from the outlet or the closing member is automatically closed and subsequently either the coupling device disengages the feeding conduit and/or the discharge means is automatically removed from the outlet. In this way the connection of the feeding conduit or the discharge means can be readily established so that a job can be economically carried out by means of this device.

Particularly when the equipment comprises two grabs movable along the inlet/outlet pipe, simple connection of the feeding conduit with the inlet pipe can be very satisfactorily carried out.

A further advantage is that the entire mechanism employed for coupling can be arranged on existing equipment for transporting and spreading fluids, also termed mixed manure distributors.

The invention relates not only to the equipment itself but also to the operating means itself and to those elements which are useful for a satisfactory operation of the equipment such as a support of the feeding conduit, an indicating device for the operating means and the use of wheel guides near the feeding conduit.

For a better understanding of the present invention and to show how it may be carried into effect, reference will now be made, by way of example, to the accompanying drawings, in which:

BRIEF DESCRIPTION OF THE DRAWINGS

FIG. 9 is an enlarged fragmentary side view of the spreader of FIG. 7 in one operative condition;

FIG. 10 corresponds to FIG. 9 but represents another operative condition;

FIG. 23 is a sectional view of the part of FIG. 22 taken on the line XXIII—XXIII in FIG. 22.

DESCRIPTION OF THE PREFERRED EMBODIMENTS

Figure 1:
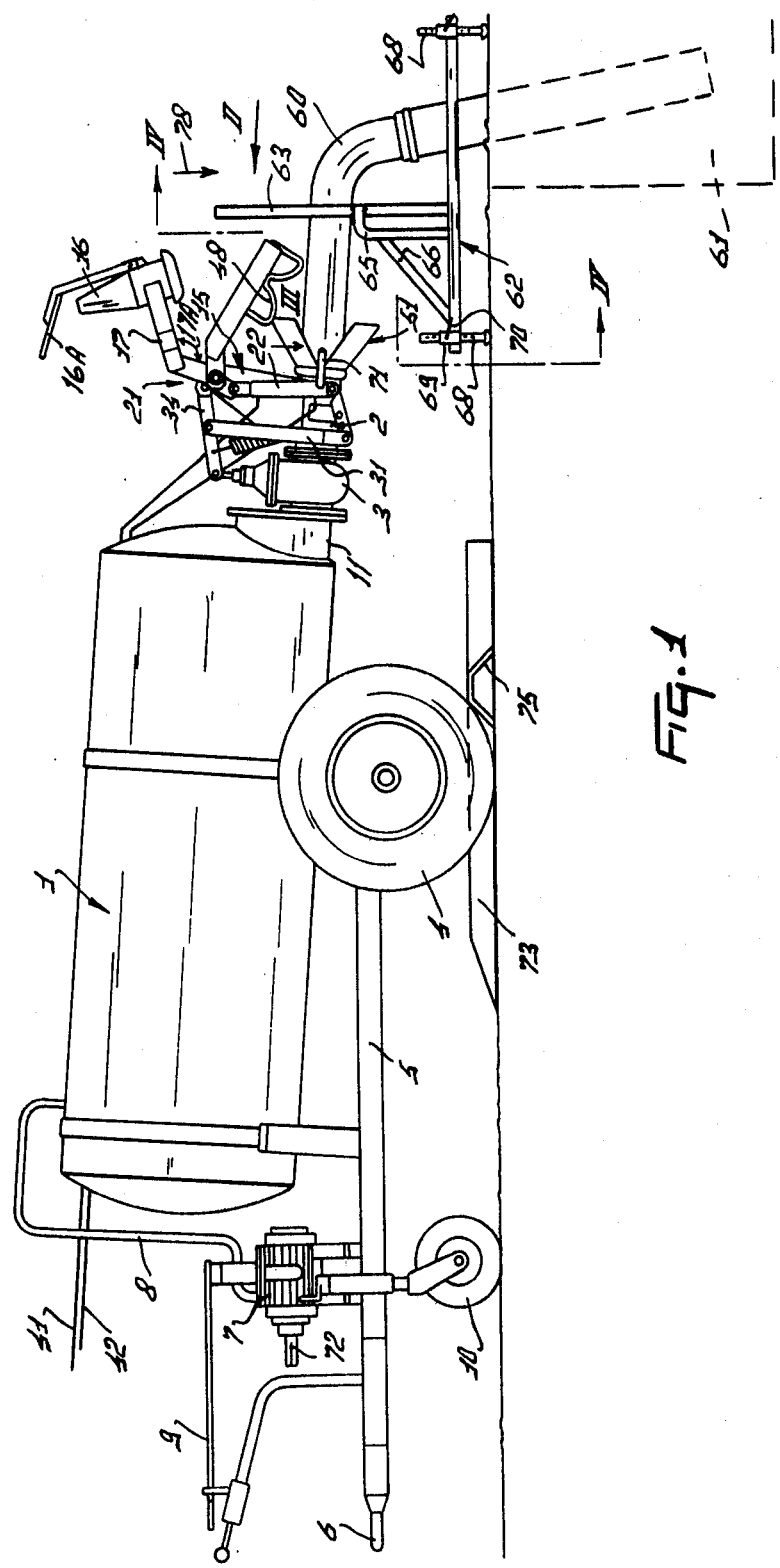
FIG. 1 is a side view of a manure spreader.

The equipment illustrated in the Figures is intended for use as a mixed manure spreader, but it can be used for other purposes. It comprises a container or hopper in the form of a tank 1 having an opening comprising an inlet 2, which may also serve in the spreader shown in FIG. 1 as an outlet. The inlet 2 is provided with a closing member in the form of a valve 3. The tank 1 is supported on a frame 5 which has ground wheels 4 and, at the front, a draw eyelet 6 to enable the spreader to be hitched to a tractor or a similar vehicle so as to be towed.

A pump 7 is mounted on the frame 5 and is connected by a pipe 8 with the top of the tank 1. A valve mechanism (now shown) in the connection between the pump 7 and the pipe 8 is provided with an adjusting arm 9 for selectively connecting either the suction or pressure side of the pump 7 to the tank so that the pump 7 can apply suction or pressure to the tank.

The frame 5 is provided with a jockey wheel 10, on which the spreader can be supported when it is not coupled by the draw eyelet 6 with a tractor.

The inlet or outlet 2 comprises a component 11 and a component 12 disposed one on each side of the valve 3, the component 11 being connected to the tank. The component 12 is provided on both sides with side plates 13 and 14 which together constitute a support 15. The spreader comprises discharge means in the form of a distribution member 16 having a spreading plate 16A. The distribution member 16 is mounted on a bracket 17 which is supported by two arms 18 on the support 15 for pivotal movement about a pivotal shaft 20. For this purpose sleeves 19 are secured to the arms 18, these sleeves being pivotable about the pivotal shaft 20 which is supported by the side plates 13 and 14. The arms 18 and the bracket 17 are at an angle 17A of about 125° to one another.

Figure 2:
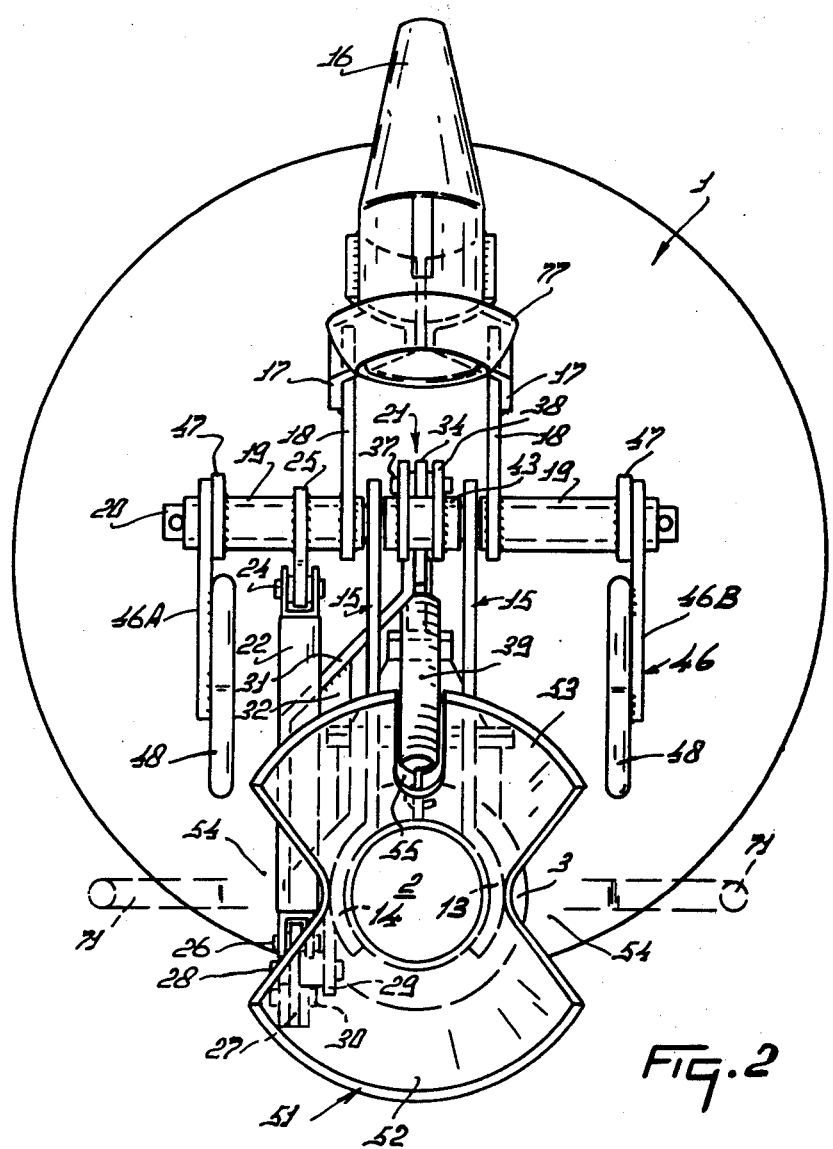
FIG. 2 is an enlarged end view of part of the spreader of FIG. 1 in the direction of the arrow II in FIG. 1.

The distribution member 16 and the valve 3 are intercoupled by a control linkage 21 which is adjustable by a hydraulic control mechanism 22. The control mechanism 22 comprises a hydraulic cylinder 22A in which a piston rod 23 is movable. The piston rod 23 is pivotally coupled by a shaft 24 with a lever arm 25 of the linkage 21 which is rigidly secured to one of the sleeves 19 (FIG. 2). The cylinder 22A is pivotally coupled by a shaft 26 with a rocker 27 of the linkage 21. The illustrated embodiment shows the preferred construction, in which cylinder 22A is a double-acting cylinder. Alternatively, two single-acting cylinders operating in opposite senses could be used. The rocker 27 is pivotable about a rocking shaft 28, which is secured to a lug 29 fastened to the inlet 2. The end of the rocker 27 away from the shaft 26 is pivotally coupled by a pin 30 to a connecting arm 31 with offset ends, this connecting arm 31 being part of the linkage 21. At one of the bends in the connecting arm 31 there is a stiffening plate 32 (FIG. 2). The connecting arm 31 is pivotally coupled by a pin 33 with a lever 34 of the linkage 21. The lever 34 is pivotally coupled by a pin 35 with a control rod 36 of the closing member 3. The lever 34 is furthermore pivotally coupled by a pin 37 with a pivotal arm 38 of the linkage 21. To this pivotal arm 38 is rigidly secured a sleeve 43, which is rotatable on the pivotal shaft 20 between the supporting plates 13 and 14. The pivotal arm 38 is thus pivotable about the horizontal pivotal shaft 20 located above the inlet 2 respectively. A tension spring 39 is arranged between the lever 34 and a tag 40 secured to the component 12.

The hydraulic control mechanism 22 can be releasably coupled by ducts 41 and 42 with the hydraulic system of a tractor or a similar vehicle to which the spreader can be hitched by means of the draw eyelet. The arrangement of these ducts is not shown in detail.

Figure 5:
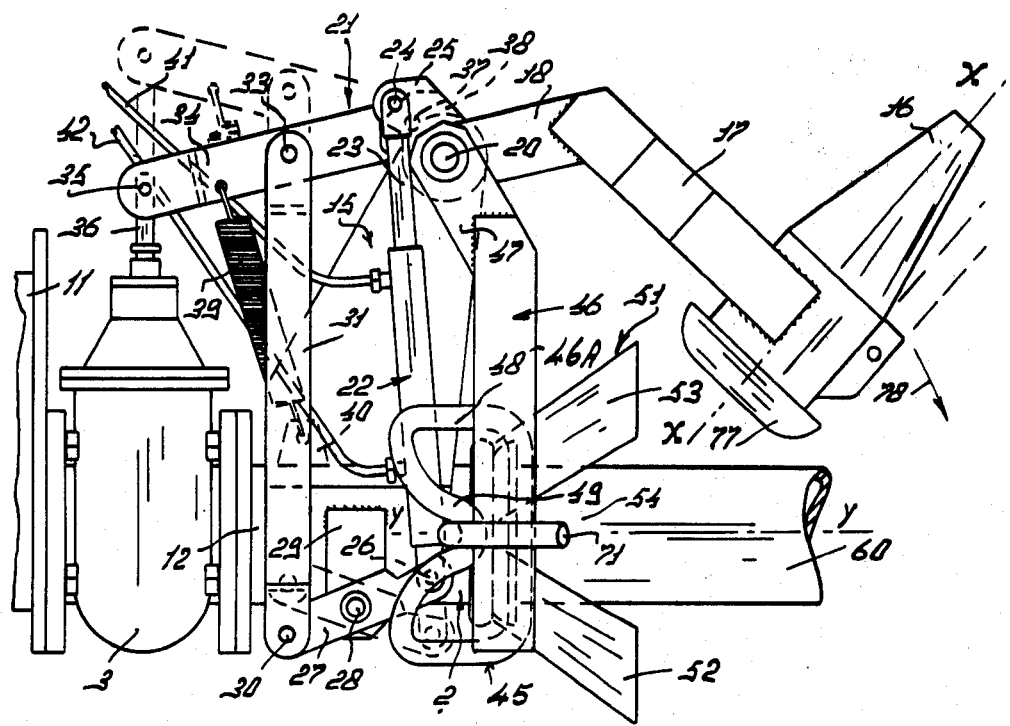
FIG. 5 is an enlarged framentary side view of the spreader in one operative condition.
Figure 6:
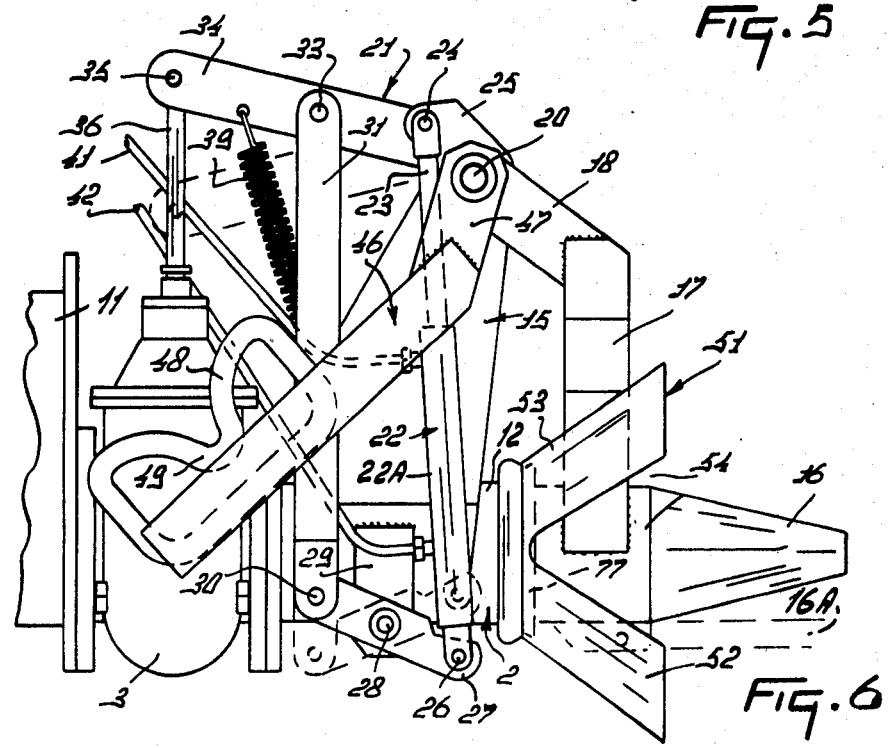
FIG. 6 corresponds to FIG. 5 but represents another operative condition.

The spreader is provided with a coupling device 46 having two identical parts 46A and 46B, which are each rigidly secured to tags 47 which, in turn, are rigidly fastened to the outer ends of the sleeves 19 surrounding the pivotal shaft 20. Thus the coupling device 46 is firmly connected by the sleeves 19 to the distribution member 16. The distribution member 16 and the coupling device 46 are disposed at an angle to one another, as is shown in the side views of FIGS. 1, 5 and 6. Each part 46A and 46B is provided with a grab 45. In this embodiment the center line X—X of the distribution member is at an angle of about 45° to the axis Y—Y of the grabs 45. As is shown in FIG. 2, the two grabs 45 of the coupling device 46 can be positioned one on each side of the inlet 2. The grabs 45 each comprise a bracket 48 providing a V-shaped guide part 49 (FIGS. 5 and 6). In the position shown in FIG. 5 the apex of the V-shaped guide part 49 is located at the level of the center line of the inlet 2, the V opening in the direction of normal travel of the mixed manure spreader. Near the opening of the inlet 2 is arranged a conical guide member 51 which has a lower part 52 comprising a part-conical lower plate and has two upper parts 53 in the form of cone sectors. The lower part 52 is separated by V-shaped recesses 54 from each of the upper parts 53. As will be apparent, for example, from FIG. 2, the V-shaped recesses 54 are symmetrically located one on each side of a vertical plane going through the center line of the inlet 2. The parts 53 are separated from one another by a slot 55 located, as can be seen, for example, in FIG. 2, centrally above the opening of the inlet 2 and shaped in a manner such that the arm 17 can move therein when the distribution member 16 (FIG. 6) is fitted to the inlet 2. The recesses 54 and 55 extend from the outer circumference of the guide member 51 to near the opening of the inlet 2.

As shown in FIG. 1, the spreader co-operates with a conduit 60, which projects into a pit 61 and constitutes a filling conduit. The conduit 60 is mounted on a frame 62. The frame 62 comprises an annular carrier 63 (FIG. 4), which is concentric with the conduit 60. Springs 64 support the conduit 60 in a slightly movable fashion relative to the carrier 63. The carrier 63 is arranged on a framework 67 by brackets 65 supported by struts 66. The framework 67 has feet 68, which are vertically adjustable in guiding sleeves 69. The feet can be set in any one of a plurality of positions by means of locking pins 70 so that the framework can be set at various heights above the ground. As is visible in FIG. 3, the conduit 60 has capturing arms 71 rear its end. The capturing arms 71 are arranged on opposite sides of the conduit 60 and extend at least substantially horizontally away from the conduit 60.

Each capturing arm 71 is V-shaped, the V opening to the rear with respect to the direction of normal travel of the mixed manure spreader. Their dimensions and shape are such that they can co-operate with the grabs 45.

The spreader can be operated to introduce a fluid or liquid material such as mixed manure into the tank by suction, and to discharge the material from the tank under pressure. The material can be sucked into the tank through the conduit 60, for example, from the collecting pit 61. The material can be discharged and, for example, be spread out by means of the distribution member 16.

In more detail, the spreader can be operated as follows.

The draw eyelet 6 of the spreader can be coupled with a tractor or a similar vehicle. The pump 7 can be linked by driving shaft 72 to the power take-off shaft of the tractor. The spreader can be maneuvered so that, for example, by driving backwards, the guide member 51 is positioned in front of the opening of the conduit 60

Figure 3:
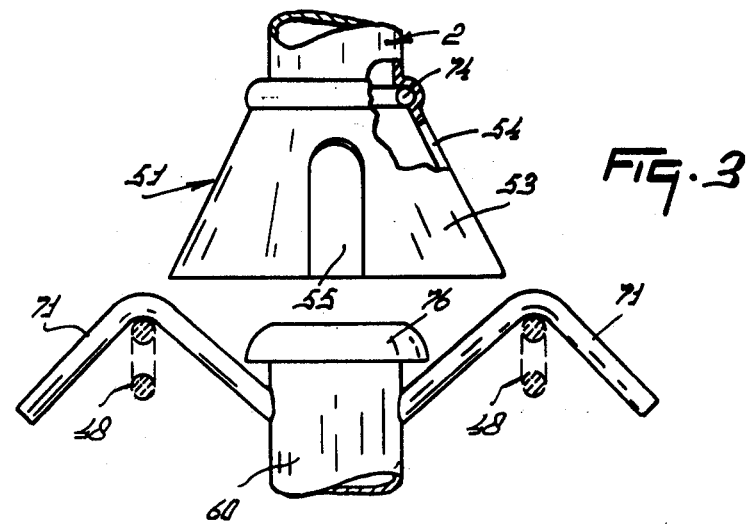
FIG. 3 is, on a scale corresponding with FIG. 2, a fragmentary view taken in the direction of the arrow III in FIG. 1.
Figure 4:
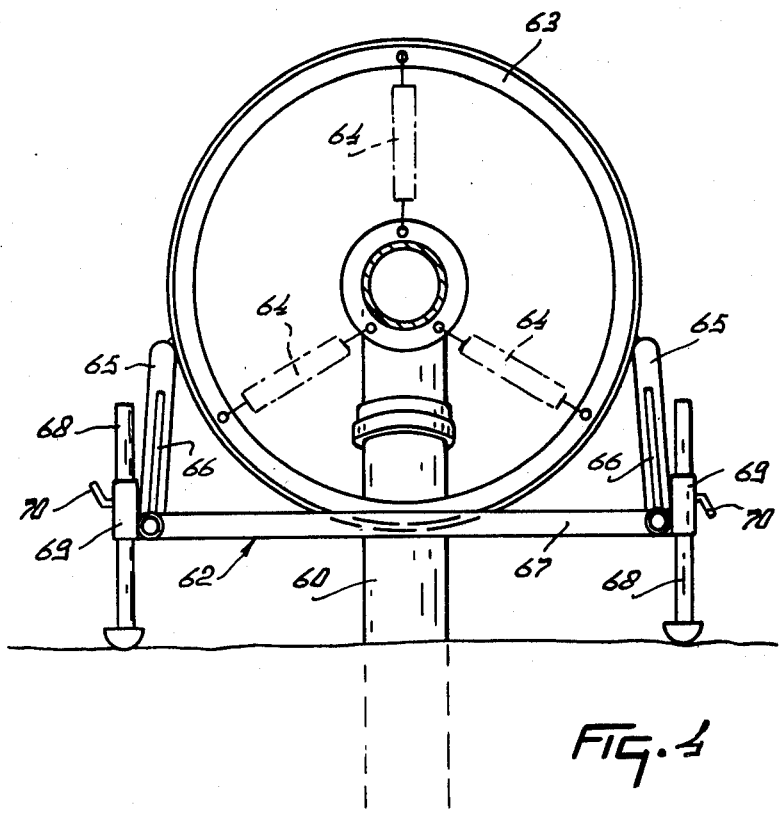
FIG. 4 is an enlarged sectional view taken on the lines IV—IV in FIG. 1.

(FIG. 3). In order to position the guide member 51 and hence the opening of the inlet 2 most effectively in front of the end of the stationary conduit 60 near the pit 61, a wheel guide 73 may be stationed on the ground near the frame 62 so that by driving the spreader backwards the wheels 4 can cooperate with the guide 73. While the spreader is being maneuvered towards the conduit 60, the pump 7 is switched off and the valve 3 is closed. In order to permit connection of the conduit 60 with the inlet 2, the distribution member 16 and the coupling device 46 are moved into the position shown in FIG. 1. This leaves unobstructed the inlet 2. The coupling device 46 is in a position in which the grabs 45 are located to the rear of and above the inlet 2, while the V-shaped guide part 49 opens downwardly. In this position of the distribution member and the coupling device 46 and with the valve 3 closed, the hydraulic ram 22A is actuated through the oil pressure ducts 41 and 42 from the tractor in a manner such that the piston rod 23 is retracted substantially completely inside the cylinder 22 as is shown in FIG. 1, the distance between the pivotal shafts 24 and 26 thus being as short as possible. In this position the opening 74 of the inlet 2 and the guide member 51 are completely unobstructed. The spreader can then be maneuvered so that the end of the conduit 60 enters the guide member 51. The wheel guide 73 may comprise a stop 75 as is shown in FIG. 1. The wheel 4 strikes this stop when the opening 74 is near the opening 76 of the conduit 60. If desired, the stop 75 may be adjustable for adapting its position to the dimensions of different mobile devices.

When the openings 74 and 76 are substantially adjoined and the conduit 60 is moved into its correct place by the guide member 51, the coupling device 46 can be turned about the pivotal shaft 20 in the clockwise direction, as viewed in FIGS. 1, 5 and 6 by means of the linkage 21 by actuating the hydraulic control mechanism 22. For this purpose the pressure in the cylinder 22A is raised so that the piston rod 23 is extended from the cylinder 22A and the distance between the pivotal shafts 24 and 26 will increase. The spring 39, acting through the lever 34, the arm 31 and the rocker 27, maintains the position of the rod 36. Thus the valve 3 remains closed. The increase in distance between the shafts 26 and 24 causes the lever arm 25 to pivot about the pivotal shaft 20, so turning the sleeves 19 fastened to the lever arm 25 about the shaft 20. The parts of the coupling device rigidly secured to the sleeves 19 will thus also turn about the shaft 20 in a clockwise direction (see arrow 78) out of the position shown in FIG. 1. This brings the V-shaped guide parts 49 of the grabs 45 into contact with the V-shaped capturing arms 71 of the conduit 60 as is shown in FIG. 3. By the action of the control mechanism 22, the coupling device 46 tends to move in the direction of the arrow 78 over a distance such that the opening 76 is brought into contact with the opening 74. In this position the coupling between the conduit 60 and the inlet 2 is established.

To fill the tank from the pit, the valve 3 has to be opened. This can be done by continuing the operation of the control mechanism 22 so that with higher pressure in the cylinder 22A the rod 23 is moved farther out of the cylinder 22A so that the distance between the shafts 24 and 26 is further increased. The pivotal shaft 24 cannot move farther upwards, because the coupling device 46 is prevented from turning in the direction 78 by the abutment of the opening 76 against the opening 74. Consequently the pin 26 will be pushed downwardly. As a result the rocker 27 will turn about the rocking shaft 28. This motion will be transmitted by the tie arm 31 to move the lever 34 upwardly against the force of the spring 39. This upwards movement of the lever 34 raises the rod 36 of the valve to open the valve 3. The fully open position is reached when the lever 34 arrives at the position shown in broken lines in FIG. 5. During its upwards movement the lever 34 pivots about the pivotal shaft 37, but the pivotal shaft 35 can nevertheless move perpendicularly upwards in the lengthwise direction of the rod 36 since the shaft 37 can move slightly as a result of rotation of the arm 38 about the pivotal shaft 20. When the valve 3 is opened and the conduit 60 is firmly coupled with the inlet 2, the pump 7 can draw air out of the tank 1 so that the tank 1 is filled through the conduit 60. The air can be sucked out of the tank 1 by the pump 7 by setting the arm 9 so that the conduit 8 is connected with the suction side of the pump 7.

When the tank 1 is filled to a desired level, the spreader can be disconnected from the conduit 60. To do this, the control mechanism 22 is actuated so that the piston rod 23 is retracted into the cylinder 22A so as to reduce the distance between the shafts 24 and 26. The sequence described above will thus be carried out in the reverse order. First the pump 7 is switched off so that air is no longer withdrawn from the tank 1, and then, under the action of the spring 39, first the valve 3 is closed, and then the grabs 45 are swung to the rear to release the conduit 60.

The spreader can then be moved to the place where the material withdrawn from the collecting pit 61 has to be distributed. In the illustrated embodiment, the material can be discharged from the tank 1 through the inlet 2, which then becomes an outlet. To distribute the material, the distribution member 16 is fitted to the outlet 2. After releasing the conduit 60, the distribution member 16 and the grabs 45 are in the position shown in FIG. 1. Oil can be fed to the control mechanism 22 to extend the rod 23 from the cylinder 22A so that, as described above, the sleeve 19 with the arm 25 turns in the direction 78 about the pivotal shaft 22. This swings the distribution member 16 in the direction 78 about the pivotal shaft 20. This time, the grabs 45 will not meet the capturing arms 71 of the conduit 60, and so the assembly of the distribution member 16 and the coupling device 46 will move farther than before, until the arms 46A and 46B with the grabs 45 move, one on each side, along the inlet 2 into the position shown in FIG. 6. Thus the distribution member 16 having an opening 77 will abut the opening 74. When the distribution member 16 engages the inlet 2, it cannot turn farther in the direction of the arrow 78 and consequently the point 24 is prevented from moving farther upwards.

As described above, the shaft 26 will then move downwards by the action of the control mechanism 22. As a result the lever 34 will be raised into the position shown in FIG. 6 so that the valve 3 is opened. Immediately before, or at the same time as, valve 3 is opened, the pump 7 can be switched on and to pump air into the tank so that the material in the tank is pressurized. Continued operation of the pump causes the material in the tank to be discharged under pressure through the outlet 2 to be spread by the distribution member 16. Thus the material can be spread uniformly over a broad strip during travel of the spreader.

When the tank is empty, the pump 7 can be switched off and the valve 3 can be closed by the control mechanism 22, after which the distribution member 16 and the coupling device 46 can be swung back into the position shown in FIG. 1. The control mechanism 22 can be advantageously actuated from the tractor via the ducts 41 and 42, which can be coupled with the hydraulic system of the tractor. The spreader can then be returned to the collecting pit 61 for recharging.

FIGS. 7 to 12 show another spreader. Those parts of this spreader which correspond with parts of the spreader shown in FIGS. 1 to 6 are designated by the same reference numerals.

Figure 11:
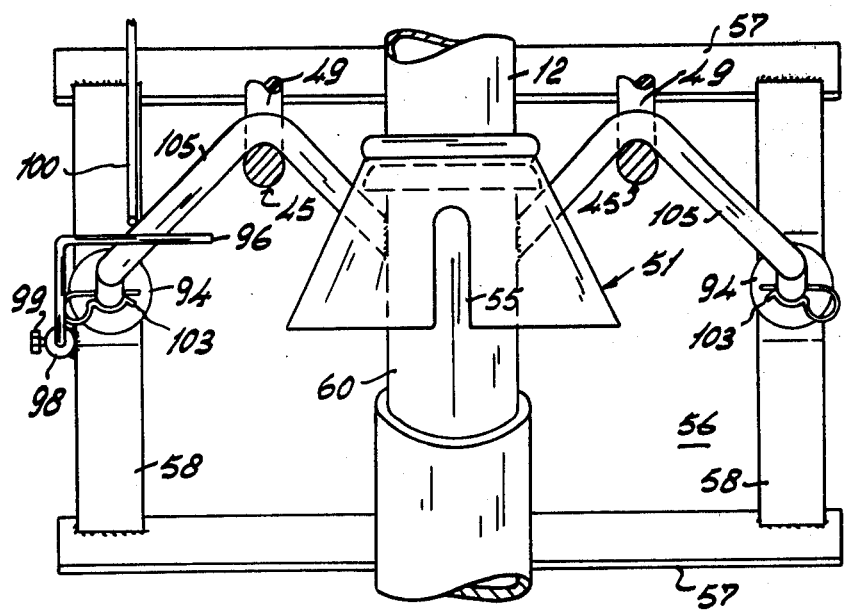
FIG. 11 is an enlarged fragmentary view taken in the direction of the arrow XI in FIG. 7.
Figure 12:
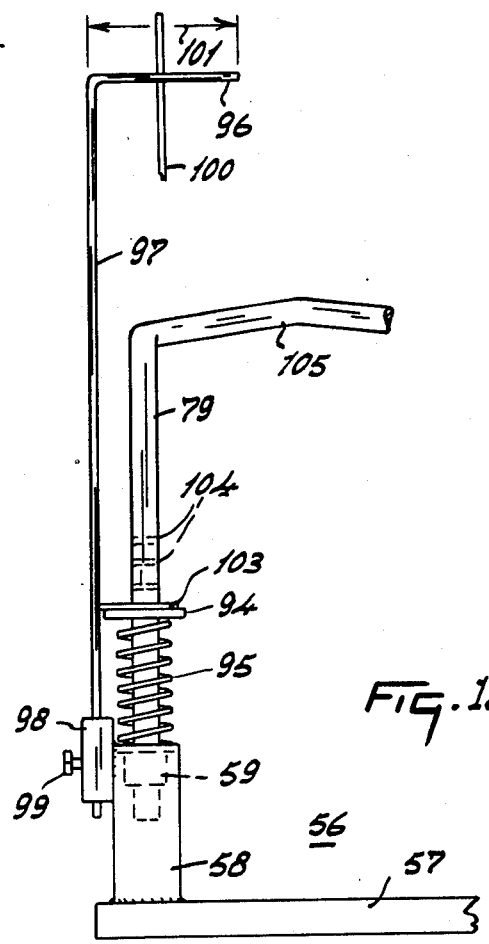
FIG. 12 is a view taken in the direction of the arrow XII in FIG. 11.

In the spreader shown in FIGS. 7 to 12 the control mechanism 22 is coupled with an indicating device 80 and the pit conduit 60 is arranged in a different manner in a supporting frame 56. The frame 56 comprises two ground beams 57 extending transversely of the length of the conduit 60, as is shown in FIG. 11. The ends of the ground beams 57 are interconnected by bridging members 58. The members 58 are provided with sockets 59, in which upwardly extending pillars 79 are slidable. A washer 94 fits over each pillar 79 and between said washers 94 and the sockets 59 there are compression springs 95 which surround the pillars 79. Above each washer 94 there is a retaining clip 103 which can be fitted at will into any one of a plurality of holes 104 in the pillars 79. The top ends of the pillars 79 are provided with capturing arms 105, which are connected with the pit conduit 60 near its opening 76. The capturing arms 105 are arranged one on each side of the conduit 60 and extend away from the conduit 60 at least substantially horizontally. The capturing arms 105 are V-shaped (FIG. 11), the open side of the V facing in the opposite direction to the opening 76. The capturing arms 105 are shaped and proportioned so that they can cooperate with the grabs 45 of the two parts 46A and 46B of the coupling device 46.

The control mechanism 22 of the linkage 21 and hence the distribution member 16 and the locking device 46 as well as the valve 3 are coupled with the indicating device 80. The indicating device 80 is shown at the front of the tank 1, but it could be elsewhere on the spreader.

The indicating device 80 is coupled with the mechanism 22 by a flexible connection 81 comprising an outer sheath 82 and an inner cable 83. The connection 81 may have any length as required. It is, for example, possible to mount the indicating device 80 in the cab of the tractor or other prime mover to which the spreader is hitched. The sheath 82 is supported at one end by a tag 84 rigidly secured to the piston rod 23. The inner cable is fastened at one end to the shaft 26, but it could be fastened to the cylinder 22A at a different place. The sheath 82 is supported at the other end by a bearing housing 85, which is arranged centrally on a dial plate 86 of the indicating device 80. In the bearing housing 85 the inner cable 83 is connected with the shaft 87, to which a pointer 88 is secured. The dial plate 86 has indication points 89 to 93. The bearing housing 85 comprises a mechanism biassing the pointer 88 towards the point 89. Traction applied to the inner cable 83 can overcome the biassing mechanism to move the pointer 88 at least to the point 93.

The frame 56 is provided with a direction indicator in the form of a rod or pipe comprising an at least substantially horizontal part 96 connected, possibly integrally, to an upwardly extending support 97. The support 97 is mounted in a sleeve 98 which is rigidly secured to the support 59. The support 97 is vertically slidable in the sleeve 98 and can be fixed at will in any one of a plurality of positions by a fixing member shown as a bolt 99. The direction indicator 96 is intended to be used with a direction pin 100, which is rigidly secured to the tank 1. The pin 100 is located beyond the rear of the tank in a position such that when the inlet 2 is in contact with the conduit 60 the pin 100 is located near the horizontal part 96.

The spreader can be used in the same way as that of FIGS. 1 to 6 for charging the tank with a fluid or liquid material such as mixed manure by suction, for transporting the material and for discharging it from the tank under pressure.

As before, the spreader will be maneuvered so that, for example, by driving backwards, the guide member 51 is positioned in front of the opening of the conduit 60. In this embodiment the guide member 51 and hence the opening of the inlet 2 can be moved accurately to the required position in front of the stationary conduit 60 disposed near the pit 61 with the aid of the direction pin 100 and the direction indicator arranged on the frame 56. The direction pin 100 and the direction indicator are disposed so that they are constantly visible, during maneuvered, from the driver's seat of the tractor to which the spreader is hitched. The pin 100 and the indicator are arranged so that when the pin 100 is moved near to the horizontal part 96 of the indicator the guide member 51 is correctly in front of the opening 76 of the conduit 60. The tractor can be maneuvered so that the pin 100 approaches the direction indicator. The horizontal part 96 has such a length 101 that when the pin 100 is located within the length 101 near the indicator 96, the guide member 51 is located accurately in front of the opening 76 of the conduit 60. Thus the guide member 51 can be readily moved near to the conduit 60 without the need to be able to see these parts from the tractor.

Coupling of the conduit 60 with the inlet 2 is assisted, as in the previous embodiment, by the slight resilience of the conduit 60 with respect to its supporting frame 56. In this embodiment, the resiliently guiding support is formed by the sockets 59 and the springs 95. This will facilitate the establishment of the connection of the opening 74 of the inlet 2 with the opening 76. The height of the opening 76 above the ground can be adjusted to the height of the inlet 2 by inserting the clip 103 into a different hole 104.

Figure 7:
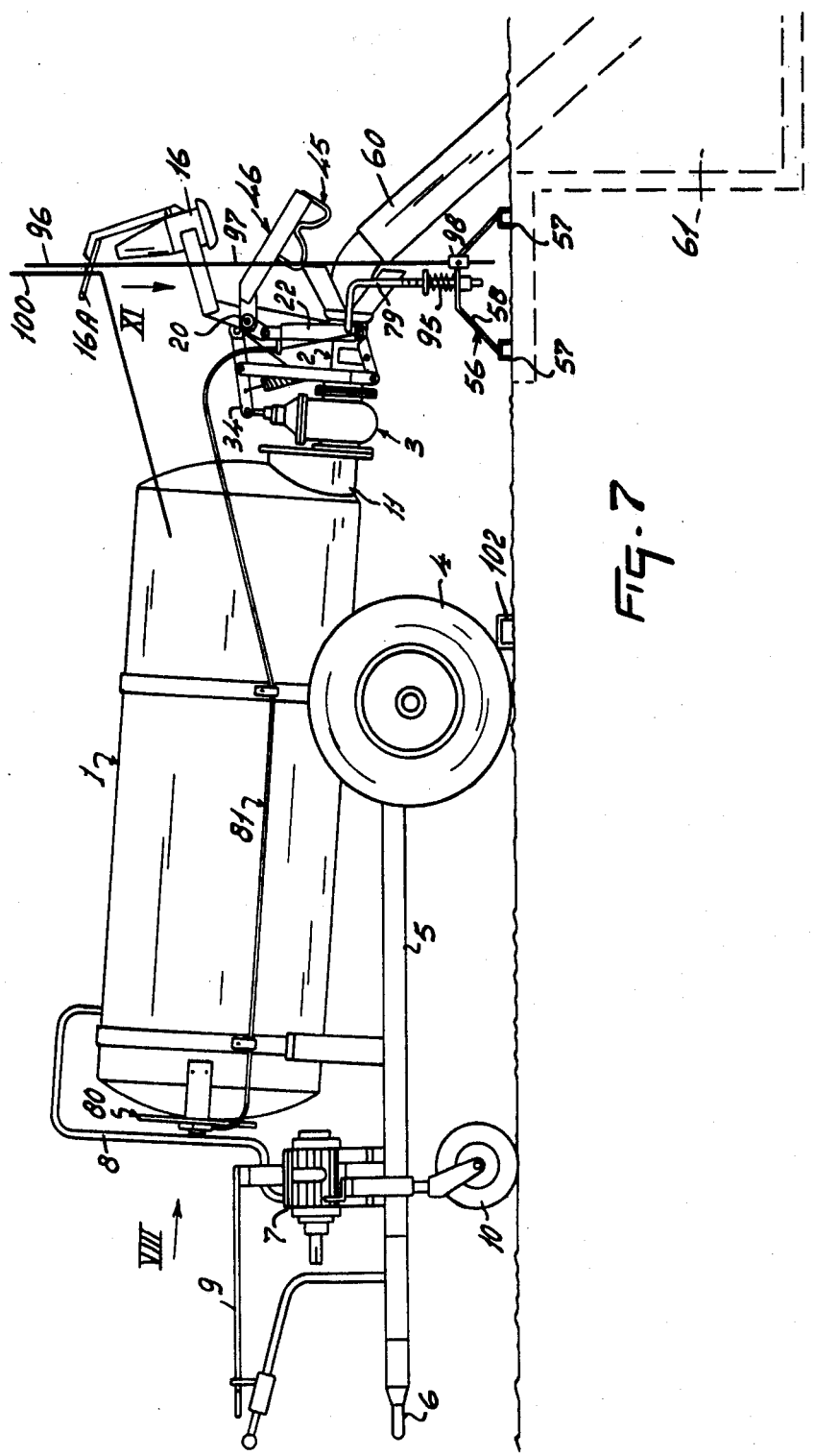
FIG. 7 shows another construction for a manure spreader.

In order to prevent the inlet 2 from pushing the pit conduit 60 in the direction towards the pit 61, a stop 102 for the wheels 4 may be provided as is indicated in FIG. 7. This stop can be arranged at such a distance from the frame 56 that the wheels 4 come into contact with it when the opening 74 is located near the opening 76. Then, in addition, the direction pin 100 will be located near the horizontal part 96 of the direction indicator 96.

The distance of the stop 102 from the frame 56 may, if desired, be adjustable for adapting the position of the stop to the dimensions of the spreader. Similarly, the height of the horizontal part 96 of the indicator can be adjusted.

The coupling of the pit conduit 60 with the inlet 2 by means of the coupling device 46 or the coupling of the distribution member 16 with the inlet 2 as well as the position of the valve rod 36 are not visible in practice from the driver's seat of the tractor. In order to provide an indication of the positions of these components, the control mechanism 22 is coupled with the indicating device 80 by the connection 81.

Figure 8:
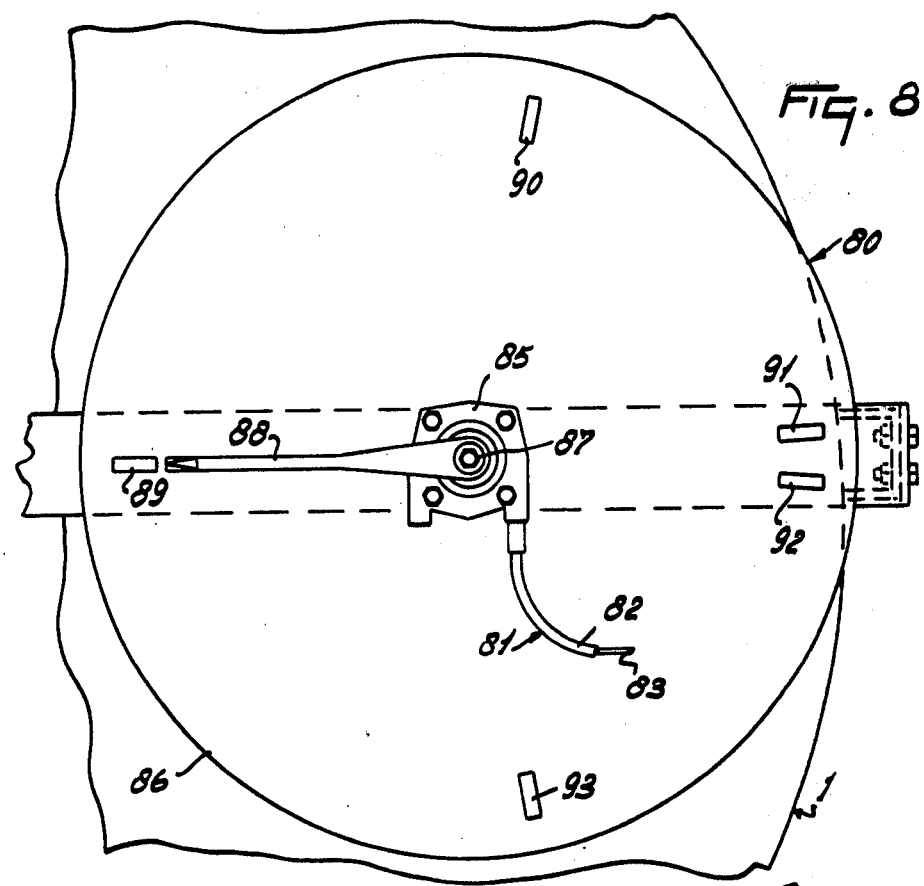
FIG. 8 is an enlarged fragmentary view taken in the direction of the arrow VIII in FIG. 7.

From the foregoing description it will be appreciated that the various positions of the distribution member 16, the coupling device 46 and the rod 36 of the valve 3 are determined by the length by which the rod 23 extends from the cylinder 22A, and consequently this length is used for indicating the positions of the members 16, 46 and 36. To this end the inner cable 83 is connected with the cylinder 22A by means of its connection with the shaft 26. The outer sheath 82 is supported by the tag 84 coupled with the rod 23. The distance between the tag 84 and the shaft 26 determines the distance over which the inner cable 83 is drawn out of the outer sheath 82, and consequently also determines the position of the pointer 88 with respect to the dial plate 86 owing to the connection of the cable 83 to the shaft 87 on which the pointer 88 is mounted. The length by which the inner cable 83 is located outside the outer sheath 82 depends on the positions into which are moved the distribution member 16, the coupling device 46 and the rod 36 by the part of the rod 23 lying outside the cylinder 22A. When the distribution member 16, the coupling device 46 and the rod 36 are in the position shown in FIG. 7, the cable 83 extends by the minimum distance out of the outer sheath 82 and the distance between the tag 84 and the shaft 26 is at a minimum. In this position the pointer 88 is retained at point 89, as shown in FIG. 8, by the biassing mechanism in the bearing housing 85. If the coupling device 46 is moved into the position shown in FIG. 9 for connecting the inlet 2 with the conduit 60, the distance between the tag 84 and the shaft 26 will increase. The inner cable 83 wil be drawn out of the outer sheath 82 over a distance such that the shaft 87 turns to bring the pointer 88 to point 90. This position of the pointer 88 thus indicates that the position shown in FIG. 9 is attained. When at the position of FIG. 9 the closing member 3 is opened and the rod 36 moves into the position shown in broken lines in FIG. 9, the distance between the tag 84 and the shaft 26 is increased again and the rocker 27 is turned into the position indicated by broken lines in FIG. 9. As a result the inner cable 83 will cause the shaft 87 to turn to bring the pointer 88 to point 92. Consequently the position of the pointer 88 near point 92 indicates that the coupling of the conduit 60 with the inlet 2 is established and that the valve 3 is open.

In the position shown in FIG. 10 the distribution member 16 is coupled with the inlet 2, which then serves as the outlet. To achieve this, the piston rod 23 is moved into the position shown in FIG. 10, and the rocker 27 occupies the position shown in broken lines in FIG. 10. The distance between the tag 84 and the shaft 26 is then such that the pointer 88 is at point 91. From this position the shaft 26 is pushed downwards and the rocker 27 turns into the position indicated by solid lines in FIG. 10. In this position the distance between the tag 84 and the shaft 26 is such that the cable 83 has moved the pointer 88 to the point 93. At this position of the pointer 88 the valve 3 is opened and the distribution member 16 is in contact with the opening of the outlet 2. From this position the device can again be moved into the initial position by moving the distribution member 16 into the position shown in FIG. 7, in which the pointer 88 returns to point 89. In the manner described above the indicating device 80 formed by the pointer 88 and the dial 86 provides an indication of the various positions of the parts 16, 46, and 3. Thus the driver can readily see what positions these parts are in, which makes the spreader easy and quick to operate without the need for the driver to leave his seat.

Figure 13:
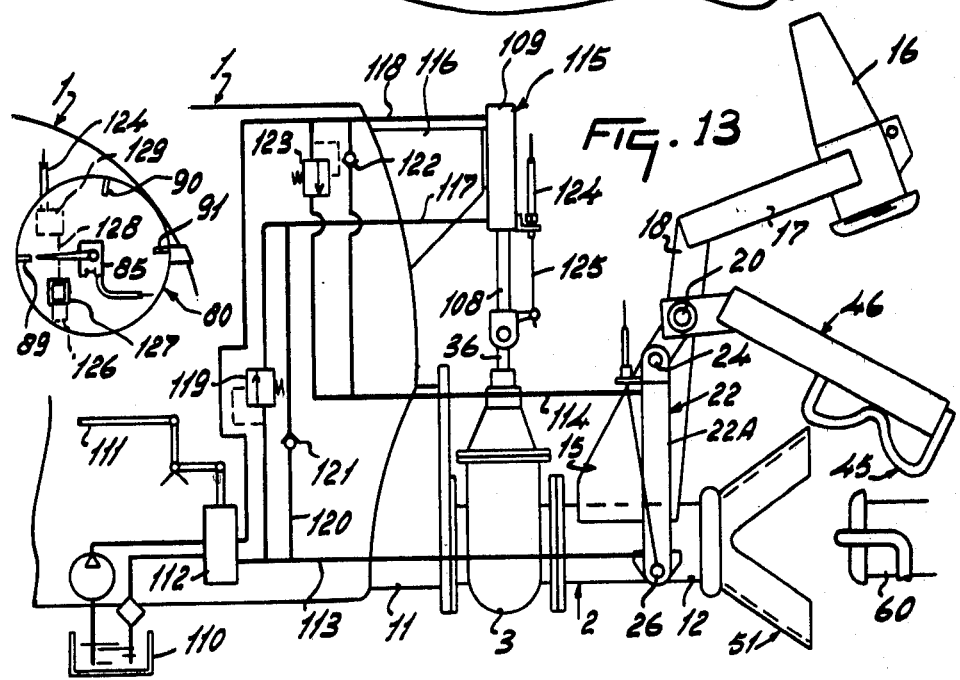
FIG. 13 is a partly schematic side view of an alternative construction for part of the spreader shown in FIG. 7.

FIG. 13 shows a different embodiment for controlling the valve 3 in conjunction with the actuation of the hydraulic control mechanism 22. In this embodiment the hydraulic control mechanism 22 is not connected through a mechanical linkage with the valve 3; instead the valve 3 is provided with a separate hydraulic valve control mechanism 115. In FIG. 13 the hydraulic system 110 of the tractor or a similar vehicle to which the spreader is hitched is shown schematically and comprises a control arm 111 and a regulating mechanism 112. The regulating mechanism 112 and ducts 113 and 118 connect the hydraulic mechanism arranged on the tractor with the control mechanisms 22 and 115. Parts corresponding with those of the preceding embodiments are designated by the same reference numerals. The duct 113 is connected with the cylinder 22A near the shaft 26, which is pivotably mounted in this embodiment directly on the part 12 of the inlet 2. The opposite end of the cylinder 22A communicates through a duct 114 with the return duct 118. The duct 114 includes a non-return valve 122. The hydraulic control mechanism 115 is fastened to a support 116 secured to the tank 1. The hydraulic control mechanism 115 comprises a cylinder 109 within which a piston rod 108 is movable. The piston rod 108 is coupled with the valve operating rod 36. The end of the cylinder 109 nearer the rod 36 communicates through a duct 117 with the duct 113. The duct 117 includes a pressure relief valve 119.

Between the ducts 117 and 113 there is a connecting duct 120 having a non-return valve 121. The end of the cylinder 109 away from the valve 3 communicates with the duct 118 and between the ducts 118 and 114 there is a connecting duct 128 having a pressure relief valve 123. As in the preceding embodiment the control mechanism 22 is linked by a cable connection 82 with an indicating device 80 having indicating points 89, 90 and 91 which display the positions of the distribution member 16 or the coupling device 46. Since in the embodiment of FIG. 13 the control mechanism 22 is coupled with the valve 3 in a different manner an indication of the position of the valve 3 is not transmitted through the cable 82 from the control mechanism 22. Instead, the outer sheath 124 of a further flexible connecting cable is connected to the cylinder 109, and the inner cable 125 of the flexible cable is fixed to the valve stem 36. The sheath 124 is coupled with a slide 126, which is movable along a window 127, which may be fastened, as shown in FIG. 13, to the dial plate 86.

In this embodiment, operation is as follows.

In order to connect the hose 60 the vehicle is driven to near the supporting means 62 or 56 as described for the preceding embodiments. When the opening of the hose 60 is near the part 12, the coupling member 46 is turned so that it urges the hose 60 against the inlet 2. To do this, hydraulic fluid is supplied to the cylinder 22A thorugh the regulating mechanism 112 from the tractor so that the piston rod 23 moves the coupling mechanism 46 into the position corresponding with the position of the coupling mechanism 46 indicated in FIG. 9. In this position, the piston rod cannot move farther out of the cylinder 22A and consequently the pressure in the duct 113 increases. The pressure relief valve 119 is set so that it opens under this increased pressure to allow hydraulic fluid to flow from the duct 113 into the duct 117 and through the latter to the cylinder 109. This drives the piston rod 108 and the valve operating rod 36 upwardly to open the valve 3.

As in the preceding embodiment, material can be sucked into the tank 1 through the conduit 60, when the valve 3 is open. The closed or opened position of the valve 3 can be indicated by the slide 126 in front of the window 127. For example, when the valve 3 is closed, the inner cable 125 positions the slide 126 so that a red section of it appears at the window 127. When the valve is open, the inner cable 125 is displaced, for example, under the action of a spring mechanism arranged in a transmission member 129, so displacing the slide with respect to the window 127, so that, for example a green section appears at the window. In this way the red or green indication at the window 127 will display the opened or closed position of the valve. When a sufficient amount of material has been sucked into the tank, the valve 3 can be closed. This may be performed by relieving the pressure from the duct 113. In theory, this pressure can be relieved from the duct 113 even during the filling operation, since there is no force tending to displace the pistons in the cylinders 22A and 109. However, for safety's sake the pressure in the duct should be maintained, for example to maintain the force on the coupling members 46. After the pressure is relieved from the duct 113 and when subsequently the regulating mechanism 112 causes pressure to be applied in the duct 118, the pressure in the cylinder 109 will rise to displace the piston rod 108 towards the valve 3, which is thus closed. When the closed position of the valve 3 is reached, the piston of the cylinder 109 cannot move farther and the pressure in this cylinder consequently rises. The pressure relief valve 123 is adjusted so that it is opened by this rising pressure in the duct 118, after the piston rod 108 has moved to close the valve 3, after which hydraulic fluid can flow through the ducts 118 and 114 to the cylinder 22A. The hydraulic fluid entering the cylinder 22A causes the piston rod 23 to retract as far as possible into the cylinder 22A, as a result of which the coupling mechanism 46 swings into the position shown in FIG. 13 enabling the conduit to be disconnected from the inlet 2. In this position the spreader, with the valve 3 closed, can be driven, for example, to the place where the tank 1 is to be emptied, such as a field onto which the material in the tank 1 is to be spread. At this place, pressure can again be generated in the duct 113 so that in the same manner as described above for the preceding embodiments the distribution member 16 comes into contact with the inlet 2, which is now to serve as the outlet. This position can again be displayed by the pointer 88 of the indicator 80 moving towards the point 91 as described above. When this position is reached, the piston rod 23 of the mechanism 22 cannot move farther with respect to the cylinder 22A with the result that the pressure in the duct 113 again rises and the valve 119 opens, after which fluid can flow into the cylinder 109. The flow of fluid into the cylinder 109 through the duct 117 results in the valve 3 being opened so that the material can be delivered from the tank 1, for example, under pressure, to be spread through the distribution member 16. When the tank has been emptied, it can be refilled through the pit conduit 60 so that the process can start again.

Figure 14:
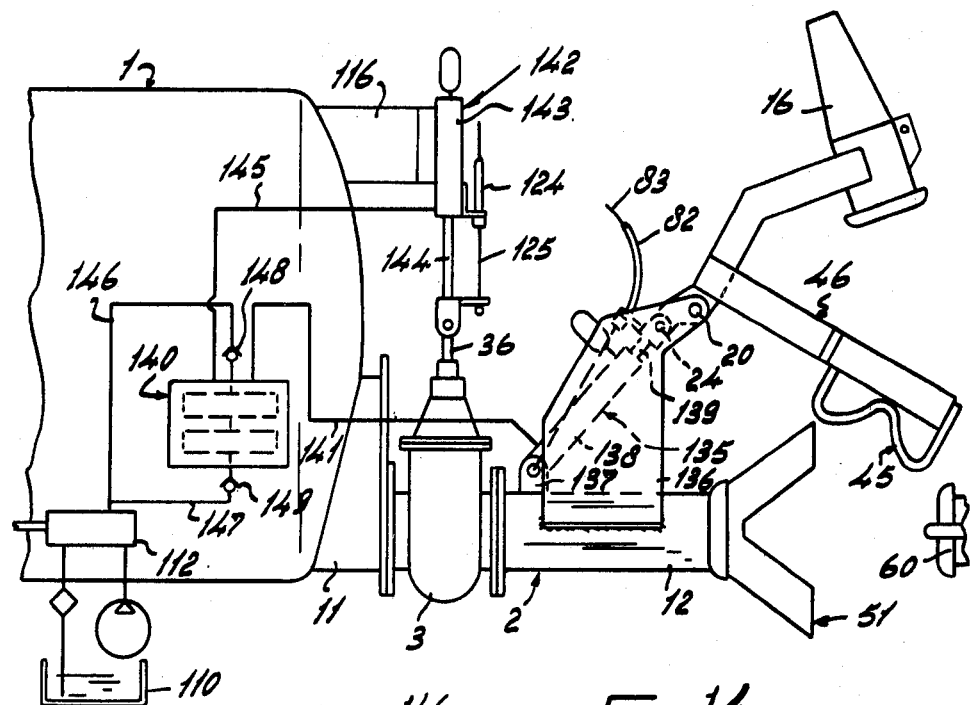
FIG. 14 shows another construction for the part shown in FIG. 13.
Figure 15:
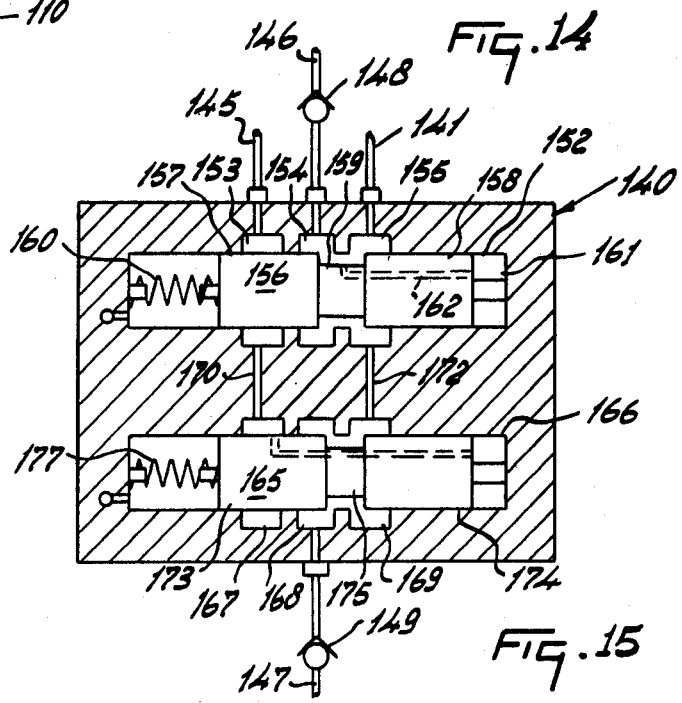
FIG. 15 shows on an enlarged scale a component of the construction of FIG. 14.

FIGS. 14 and 15 show a further embodiment of a control mechanism for the valve 3 and the coupling member 46 with the distribution member 16. The parts of this embodiment corresponding with those of the preceding embodiments are designated by the same reference numerals. In this embodiment the shaft 20 with the coupling device 46 and the distribution member 16 coupled therewith is arranged between two plates 136 arranged one on each side of the part 12 of the inlet 2. Between the supporting plates 136 there is a hydraulic control mechanism 135, one end of which is pivoted to a support 137 fastened to the part 12 and the other end of which is coupled by means of the shaft 24 with the lifting arm 25. As in the first embodiment, the arm 18 is connected to the coupling device 46 and the distribution member 16. The control mechanism 135 comprises a cylinder 138 and a piston rod 139 operating as a gas-filled strut. The pressure in the cylinder 138 tends to hold the piston rod 139 in its fully retracted position. The end of the cylinder 138 nearer the support 137 is coupled by a duct 141 with an automatically regulating control-block 140. The operating rod 36 is coupled with a hydraulic control mechanism 142, which is fastened to the support 116 of the tank 1. The mechanism 142 comprises a cylinder 143 and a piston rod 144, which also act as a gas-filled strut. The piston rod 144 is coupled with the rod 36. The cylinder 143 communicates through a duct 145 with the control block 140. The control block 140 communicates through a feeding duct 146 with the regulating mechanism 112 of the tractor. The control block 140 also communicates with the regulating mechanism 112 through a return duct 147 and through the duct 146. The duct 146 includes a non-return valve 148 so that through this valve fluid can only pass in the direction to the control block 140. The duct 147 includes a non-return valve 149 which permits fluid to flow only from the control block 140 to the return duct 147.

The control block 140 comprises a cylinder 152 having axially spaced annular recesses 153, 154 and 155. In the cylinder 152 there is a control piston 156 having two lands 157 and 158, which are interconnected by a portion 159 which is narrower in diameter than the lands 157 and 158. A channel 162 extends through the land 158 and opens at one end at the end face of the land 158 and at the other end at the periphery of the portion 159. Between the land 157 and one end of the cylinder 158 there is a compression spring 160. At the other end of the cylinder 152 there is a preferably slightly resilient buffer block 161.

The control block 140 comprises a second cylinder 166 provided like the cylinder 152 with three axially spaced recesses 167, 168 and 169. The recesses 167 and 169 are connected by ducts 170 and 172 respectively with the recesses 153 and 155. The ducts 145 and 141 communicate with the recesses 153 and 155 respectively and the duct 146 communicates with the recess 154. The recess 168 communicates with the return duct 147. The cylinder 166 contains a piston 165 having lands 173 and 174 interconnected by an intermediate portion 175. The cylinder 165 has a channel 176, which opens into the cylinder 166 at the right-hand end of the piston 165 as viewed in FIG. 15 and which opens at the other end of the periphery of the portion 173. Between the piston 165 and one end of the cylinder 166 there is a compression spring 177 and at the other end of the cylinder 166 there is a buffer block 171.

The embodiment shown in FIGS. 14 and 15 operates as follows.

As in the first embodiment, in order to couple the conduit 60 with the part 12 of the inlet 2, the coupling device 46 has to be turned about the shaft 20. For this purpose the piston 139 is extended from the cylinder 138 by supplying hydraulic fluid to the cylinder 138 through the duct 141. The piston 139 moves against the gas pressure in the cylinder 138, for which purpose the pressure in the duct 141 is raised to the required value. The hydraulic fluid can flow from the tractor through the regulating mechanism 112 and the duct 146 to the annular recess 154, from which the fluid medium can flow along the intermediate portion 159 and through the annular recess 155 into the duct 141. When the coupling member 46 causes the conduit 60 to abut against the inlet 2, the piston 139 cannot move farther out of the cylinder 138. The pressure in the ducts 146 and 141 consequently rises. The force of the spring 160 is eventually overcome by this rise of pressure in the duct 141 and the piston 156 is moved to the left, as viewed in FIG. 15. This movement is possible since the pressurized hydraulic fluid can flow through the channel 162 on the right-hand side of the piston 156 and the pressure exceeds the spring tension 160 so that the piston 156 moves to the left. When the land 158 has been moved to the left to an extent such that the recess 155 is closed by the periphery of the land 158, the land 157 has moved sufficiently far to the left to provide communication between the recesses 153 and 154 along the portion 159. The hydraulic fluid can then flow from the duct 146 into the duct 145 so that the piston 144 is displaced in the cylinder 143 to raise the valve operating rod 36 and to open the valve 3. The hydraulic fluid flowing into the recess 153 can pass through the duct 170 into the recess 167. From there the fluid can flow through the channel 176 to the right-hand side of the piston 165 where the resulting pressure causes the piston 165 to move to the left against the force of the spring 177. The land 174 then moves to the lift to shut off the recess 169 from the recess 168. Meanwhile, the pressure in the duct 145 opens the valve 3 completely under the action of the displacement of the piston 144 in the cylinder 143. The pressure in the duct 147 is the same on both sides of the non-return valve 149 so that this valve remains closed while the pressure in the duct 146 is maintained for holding the valve 3 in the open state and for maintaining the connection of the coupling device 146. After the tank is filled by suction in the manner described above, the valve 3 can be closed and the conduit 60 can be discoupled. This can be carried out by relieving the pressure in the ducts 146 and 147. The gas pressure in the cylinder 143 dominates over the gas pressure in the cylinder 135. When the pressure in the ducts 146 and 147 is eliminated, the duct 145 will communicate through the recess 153, the duct 170 and the recess 167, along the portion 175 and through the recess 168 with the duct 147. The gas pressure in the cylinder 143 will drive the hydraulic fluid out of the cylinder 143 and the valve 3 will close. When the valve closes the hydraulic pressure has decreased far enough for the spring 177 to overcome the fluid pressure in the cylinder 166 on the right-hand side of the end of the piston 165. The piston 165 will then move to the right so that the land 174 causes the recess 168 to communicate with the recess 169. The recess 169 communicates through the duct 172 with the recess 155 and the duct 141. The pressure in the duct 147 is then lower than the gas pressure in the cylinder 138 so that the piston 139 is driven into the cylinder 138 and the coupling device 46 releases the conduit 60. After the spreader has been moved to the place where the tank 1 is to be emptied, the distribution member 16 can be coupled by generating pressure in the cylinder 138, in the manner described above, as a result of which the pistons 156 and 165 in the cylinders 152 and 166 automatically move so that once the distribution member 16 is coupled to the inlet 2 (now to serve as the outlet), the valve 3 is opened and the material can be spread under pressure from the tank through the valve 3 and through the distribution member 16. The control block 140 of this embodiment thus provides an automatic control so that, the valve 3 will open only when the conduit 60 or the distribution member 16 is coupled to the inlet 2, whereas before disengaging the conduit 60 or the distribution member 16 from the inlet 2, the valve 3 will first close. Using the spreader shown in FIGS. 14 and 15, the system can be caused to become operative from, for example, a tractor which can only either apply pressure in the connected duct or relieve that pressure, without the change-over facility which is essential for the embodiment of FIG. 13.

In the construction illustrated in FIGS. 14 and 15, the control mechanism 135 is advantageously arranged centrally over the part 12 so that the forces exerted on the arms of the coupling member 46 are substantially symmetrical with respect to the vertical plane going through the center line of the part 12.

As in the embodiment shown in FIG. 13, the positions of the members 46 and 16 can be displayed by an indicating member 80, for which purpose the control member 82, 83 is connected with the control mechanism 135 in substantially the same manner as in the preceding embodiment. The position of the valve 3 is displayed on the indicating member 80 by means of a control member 124, which is coupled with the mechanism 143 and the valve operating rod 36 in the same manner as shown in FIG. 13.

Figure 16:
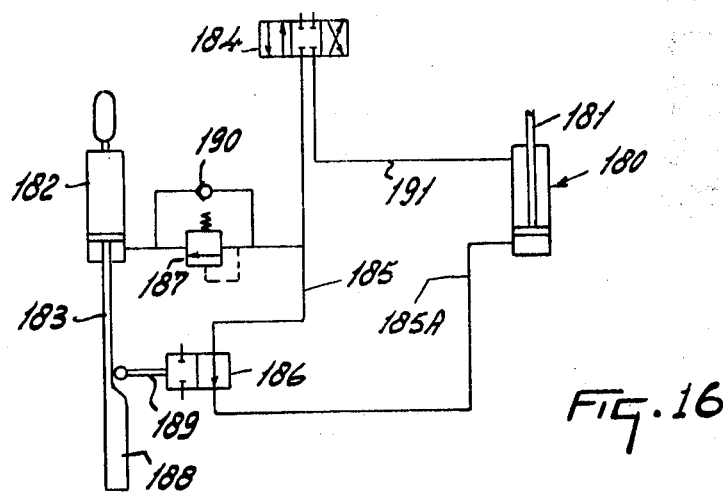
FIGS. 16 to 18 show schematically three variants for the spreader of FIG. 7.

FIG. 16 shows schematically a further embodiment for actuating the mechanisms controlling the coupling member 46, the distribution member 16 and the valve 3. The system shown in FIG. 16 comprises a cylinder 180 with a piston rod 181 comparable with the cylinder 138 and the piston rod 139 in the embodiment shown in FIG. 14. The system of FIG. 16 also comprises a cylinder 182 and a piston rod 183, which are similar to the cylinder 143 and the piston rod 144. For the operation and control of the members connected with the piston rod 181 and the piston rod 183 reference is made to the preceding embodiments.

The movement of the piston rods 181 and 183 is obtained as follows. From the regulating mechanism 184 (comparable with the regulating mechanism 112) of the tractor, hydraulic fluid is pumped into the ducts 185 and 185A including the valve 186, which is then open so that pressure builds up in the cylinder 180. Consequently the piston rod 181 is extended from the cylinder to actuate the members 46 and 16. When the member 46 or 16 reaches its end position in the manner described above and the piston rod 181 is thus prevented from moving further out of the cylinder 180, the pressure in the duct 185 rises and eventually causes a pressure relief valve 187 to open to allow the fluid to flow into the cylinder 182. The result is that the piston rod 183 moves upwards from the position shown in FIG. 16 so as to open the valve 3. A short time after the piston rod 183 begins to move upwards and the valve 3 opens, a cam 188 closes the valve 186. When the valve 3 is completely open, which is when the piston rod 183 is fully retracted, the tank 1 will be filled by suction through the pit conduit 60. When the tank 1 is full, the valve 3 has to be closed and this is done by relieving the pressure in the duct 185, which is placed in open communication with the return duct of the hydraulic system so that the piston 183 can be urged downwards in the cylinder 182 under gas pressure to close the valve 3. The hydraulic fluid displaced from the cylinder 182 can flow away through a non-return valve 190 to the pressure-free duct 185. At the instant of closure of the valve 3, the cam 188 is moved along the valve control-stem 189 to an extent such that the valve 186 is again opened. By pumping fluid into the duct 191 the piston 181 can be retracted, the displaced fluid then being able to flow back through the duct 185A and the opened valve 186 to the hydraulic system of the tractor. In the hydraulic control system of FIG. 16 the valve 3 is held closed during the manevering of the coupling device 46 or the distribution member 16. The valve 3 is, therefore, opened only either when the coupling member 46 connects the pit conduit 60 to the inlet 2 or when the distribution member 16 is connected with the inlet 2 (then operating as an outlet).

Figure 17:
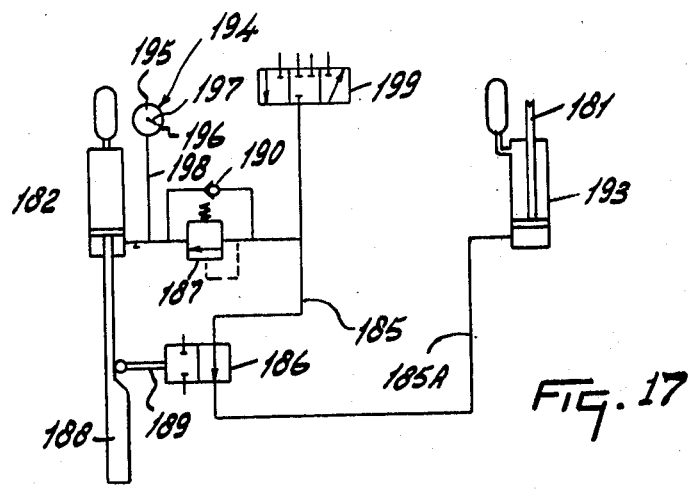

FIG. 17 shows schematically a further embodiment of the control system for the operation of the valve 3 and the members 46 and 16. The parts of this embodiment corresponding with those of FIG. 16 are designated by the same reference numerals. In this embodiment the cylinder 180 is replaced by a cylinder 193, which is a gas-filled strut. In this system the piston rod 181 is moved against the gas pressure by hydraulic fluid supplied through the duct 185 and the duct 185A. When the end position of the piston rod 181 is attained, the pressure relief valve 187 is opened to allow fluid to flow into the cylinder 182 for moving the piston rod 183 upwards to open the valve 3, and closing the valve 186 at the beginning of its movement. When the tank is full, the valve 3 is closed by relieving the pressure in the duct 185 so that the piston rod 183 moves downwards again by gas pressure. The hydraulic fluid can then flow through the non-return valve 190 to the duct 185. As the piston rod 183 moves into its end position for closing the valve 3, the valve 186 is opened to allow the piston rod 181 to be retracted by gas pressure, to return the members 46 and 16 to, for example, the position shown in FIG. 14. The positions of the members 16 and 46 can be displayed through a flexible cable 82 on an indicating member as in the embodiment shown in FIG. 13. An indication of the position of the valve 3 can be obtained in this embodiment by means of a gauge 194 connected with a duct 198 tapping the pressure between the pressure relief valve 187 and the cylinder 182. The needle 197 of the gauge 194 will be, for example, at position 195 when the piston rod 183 holds the valve 3 closed, the pressure in the duct 198 then being lower than the gas pressure in the cylinder 192. When the pressure in the duct 198 is raised to move the piston rod 183 against the gas pressure, the needle 197 of the gauge will move, for example, to a position 196, which corresponds to the pressure then prevailing in the duct 198 for moving the piston rod 183 upwards for opening the valve 3. Consequently, the position of the needle 197 at one of the points 195 or 196 is indicative of the state of the valve 3.

Figure 18:
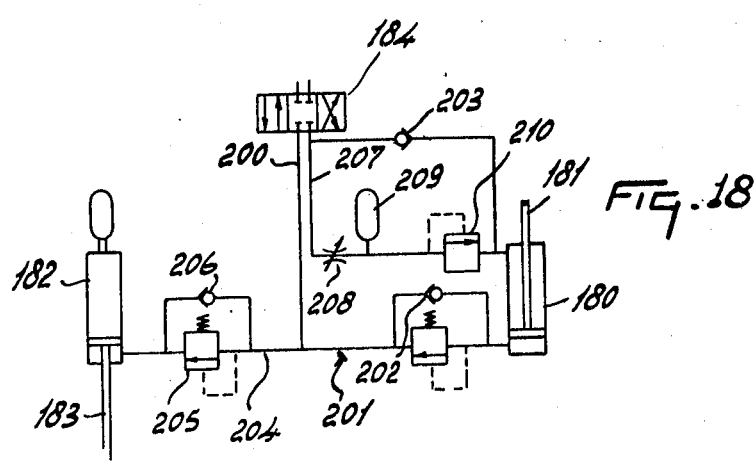

FIG. 18 shows a further embodiment of a control system for the members 16 and 46 and the valve 3. The control mechanisms 180, 181 and 182, 183 respectively shown in FIG. 18 correspond with those of the embodiment shown in FIG. 16 so that reference may be made to the description of that embodiment. However, unlike the preceding embodiment, the piston rod 183 is not provided with a cam 188 for controlling the valve stem 189 of a valve 186. For moving the piston rod 181 at the start of the operation, fluid is pumped through the regulating mechanism 184 of the tractor into ducts 200 and 201, through a non-return valve 202 into the cylinder 180 for displacing the piston rod 181. When the piston rod 181 reaches its end position for coupling the pit conduit 60 by means of the coupling member 46 or for connecting the distribution member 16, the pressure in the ducts 200, 201 will rise so that eventually a pressure relief valve 205 will open to allow fluid to flow through a duct 204 into the cylinder 182 to actuate the piston rod 183 so that the valve 3 is opened. When the tank 1 is full, pressure is relieved from the duct 200 and hydraulic fluid will be fed instead to a duct 207. The piston rod 183 will be moved downwards under gas pressure, the hydraulic fluid flowing through a non-return valve 206 and the duct 204 into the duct 200 towards the hydraulic system of the tractor. At the same time pressurized fluid flowing through the duct 207 will pass to the cylinder 180 to return the piston rod 181 to the position shown in FIG. 18. However, the movement of the piston rod 181 is retarded by a choke valve 208 and an accumulator 209 in the duct 207. The choke 208 and the accumulator 209 are arranged so that a pressure relief valve 210 starts operating only when the piston rod 183 has returned to its return position shown in FIG. 18, and valve 3 is closed. Only then will fluid flow into the cylinder 180 for moving the piston rod 181 back into the position shown in FIG. 18, in which either the distribution member 16 or the coupling device 46 is disengaged.

It will be obvious that the control systems shown in FIGS. 16, 17 and 18 for the valve 3, the coupling member 46 and the distribution member 16 ensure that the valve 3 is always closed when the distribution member 16 or the pit conduit 60 are not connected in the desired manner with the inlet 2.

The spreaders which have been described can be advantageously employed for distributing fluid having fertilizing value such as liquid or mixed manure on the land. These fluids are known to be collected in pits. The device may, however, also be used for other kinds of fluids.

Although in the embodiments described the spreader is shown to comprise both a distribution member 16 and a coupling device 46, the inventive idea may, as an alternative, be applied without, for example, the coupling device 46. In this case only the distribution member 16 is used in conjunction with the valve 3 so that, when the distribution member 16 is connected with the outlet 2, the valve is open, whereas the valve is closed when the distribution member is away from the outlet 2 as is shown in FIG. 1 or 5.

The construction may also be used without a distribution member, in which case only the coupling device 46 is employed. As described above, the valve 3 can be held in the closed state when the conduit 60 is not connected with the inlet 2. The valve can be automatically opened when the conduit 60 is connected in the desired manner with the inlet 2. This construction can be used when the spreader has, apart from an inlet, a separate outlet, which may have a spray nozzle actuated, as the case may be, by a corresponding mechanism. As a further alternative, the control mechanism concerned may be used for connecting the pit conduit 60 with the coupling device or the distribution member 16 with the inlet 2 without that mechanism being coupled with the valve.

As described above (see FIG. 5) the axes X—X and Y—Y are shown at an angle of about 45° to one another. The size of this angle particularly depends on the free space required for enabling the connection of the conduit 60.

Spreaders embodying the invention may have various advantages. The spreader can be connected in a simple manner with the pipe of a collecting pit and the valve can be controlled without the need for the tractor driver to leave his seat. The assembly can be simply controlled. A further advantage is that the distribution member can be set in place in a simple manner, while also in this case the valve can be actuated without the tractor driver leaving his seat. Manevering the device can be simple.

A further advantage of the spreader is that it can be mounted on any existing device for spreading liquid or mixed manure. Such known devices have an outlet or inlet pipe respective, to which a closing member is bolted. Instead of the known construction the construction with the valve 3 can be mounted on the hopper because this construction does not have fastening points on the tank 1 or the frame 5.

FIGS. 19 to 30 show another spreader. Those parts of this spreader which correspond with parts of the spreader shown in the FIG. 1 are designated by the same reference numerals.

The inlet or outlet 2 respectively comprises three parts, a length of pipe 211 adjoining the hopper, with which is coupled the closing member 3, for example, by means of a flange or screwthread joint. With the closing member 3 is coupled by means of a flange or screwthread joint a length of pipe 212. On both sides of the length of pipe 212 supporting plates 213 and 214 are fastened parallel to one another and extend upwardly from the pipe 212 and together they form a supporting member 215. With the supporting member 215 is coupled a spreading member 216 provided with a spreading plate 216A by means of a carrying arm 217. The carrying arm 217 is fastened to a sleeve 218 located between the supporting plates 213 and 214 and being rotatable about the pivotal shaft 20 arranged in the supporting plates 213 and 214. The carrying arm 217 is provided on the side of the sleeve 218 opposite the spreading member 216 with a short lever arm 221, which is coupled with a setting member 222 located between the plates 213 and 214. The setting member 222 is a hydraulically actuable member comprising a piston rod 224, which is coupled by means of a pivotal shaft 223 with the lever arm 221. The member 222 comprises a cylinder 225, which is coupled by means of a pivotal shaft 226 with a tag 227 fastened to the length of pipe 212. The member 222 constitutes a hydraulic steering mechanism for the spreading device 216 and the coupling device 264 to be discussed hereinafter.

Figure 24:
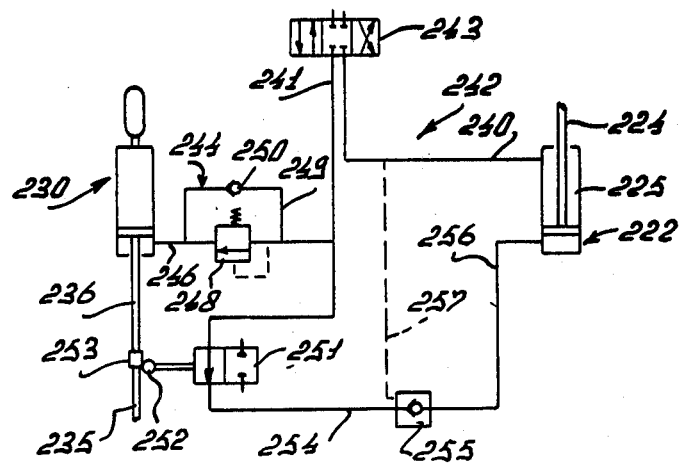
FIG. 24 shows the hydraulic diagram of the relative coupling of the hydraulic parts of the device.

The closing member 3 is provided with a hydraulic control-mechanism formed by a gas spring cylinder 230. The gas spring cylinder 230 is rigidly coupled by means of a tie piece 233 with the valve stem guide 232 rigidly secured to the housing 231 of the closing member. The tie piece 233 is provided with a fastening sleeve 234, which is rigidly secured to the valve stem guide 232. The valve stem 235 is coupled with the cylinder rod 236 of the gas spring cylinder 230. The gas spring cylinder 230 and the setting member 222 are relatively coupled by a hydraulic communication system 242 comprising hoses 240 and 241, which can be connected with the hydraulic system (not shown) of the tractor to which the device can be hitched. The communication system 242 is schematically shown in FIG. 24. In this diagram the control-mechanism fastened to the tractor and with which the hoses 240 and 241 can be coupled is designated by 243.

The hose 240 is coupled with the cylinder 225 near the end thereof, where the piston rod 224 emerges from the cylinder. The hose 241 is connected with a valve housing 244, which is supported by an arm 245 fastened to the connecting guide 233. The valve housing 244 is coupled through a hose connection 246 with the gas spring cylinder 230. Between the junction of the hose 241 on the valve housing 244 and the junction of the hose 246 on the valve housing is arranged an excess pressure valve 248, which is adjustable by means of a control-nut 247. The valve housing 244 has a connection 258 for pressure meter so that the effect of the excess pressure valve 248 can be adjusted through the control-nut 247 in accordance with the meter. The hose 246 is coupled through a hose link 249 with an inlet piece 250 of the valve housing 244 comprising a non-return valve. The valve housing 244 is connected with a valve housing 251 also supported by the arm 245. Through the connection of the valve housing 244 with the valve housing 251 the hose 241 is in open communication with the valve housing 251. The valve housing 251 comprises a control-lug 252 co-operating with a stop 253 arranged in the connection between the valve stem 245 and the cylinder rod 236. The stop 253 may be fastened at a different place to the rod 236 or 235 depending on the place of the lug 252. The valve housing 251 is connected through a hose 254 with a controlled non-return valve 255, which is coupled through a hose joint 256 with that end of the cylinder 225 which is remote from the end where the piston rod 224 emerging from the cylinder 225 is located. The controlled valve 255 communicates through a hose 257 with the hose 240.

The supporting plates 213 and 214 are fastened to the hopper 1 through two supporting strips 261 located on the distal sides of the supporting plates 213 and 214. The strips 261 are parallel to one another and fastened to a flange 260 of the hopper. The strips 261 are located above the inlet and outlet 2 and parallel thereto.

Figure 20:
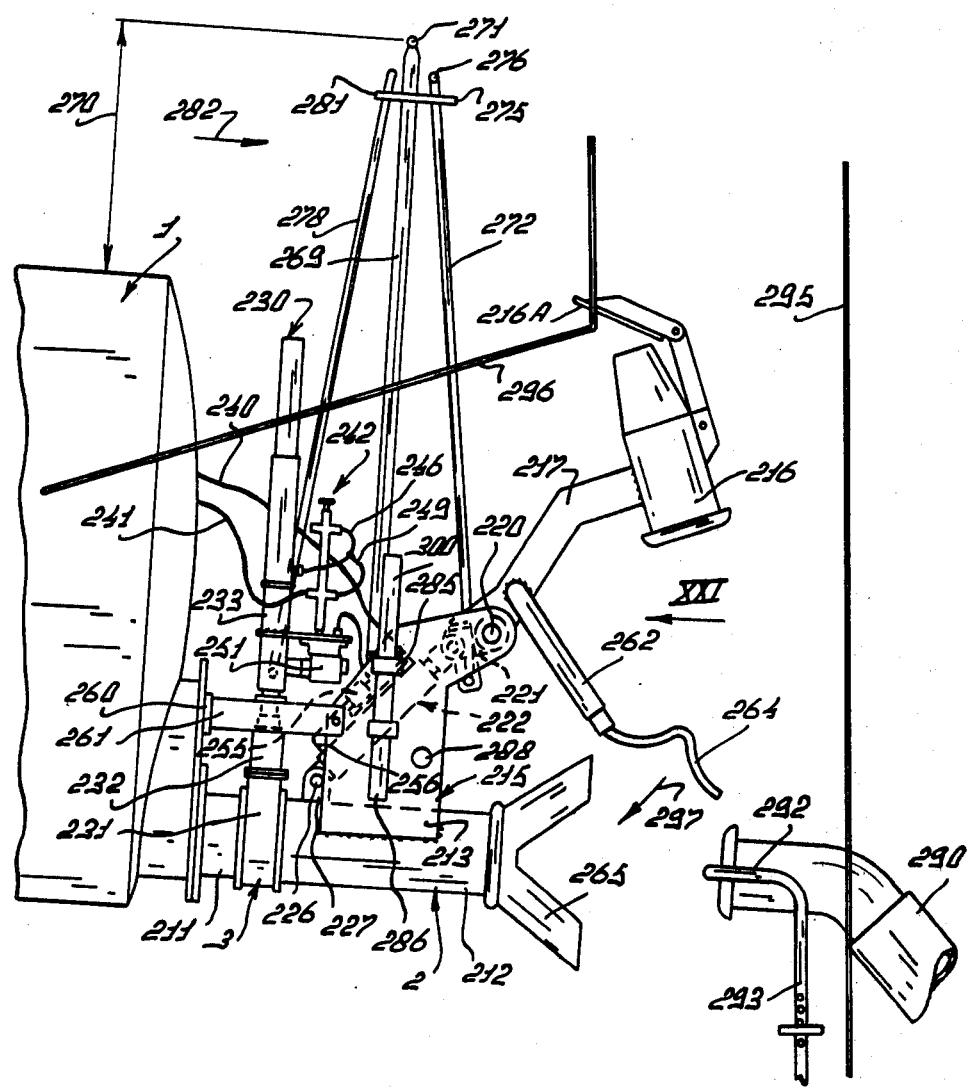
FIG. 20 shows on an enlarged scale part of the side elevation of the device shown in FIG. 19.
Figure 21:
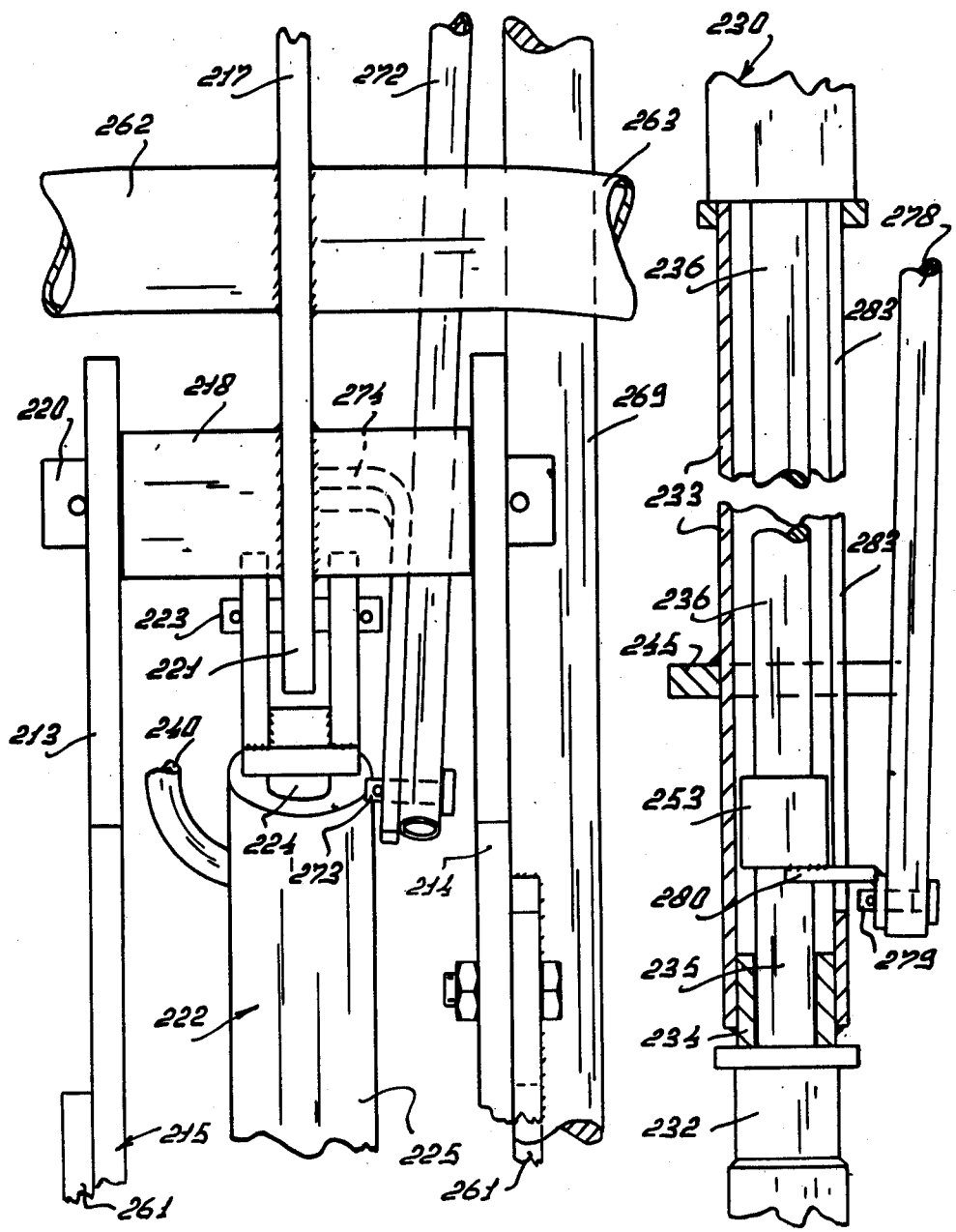
FIG. 21 shows on an enlarged scale part of the device taken in the direction of the arrow XXI in FIG. 20.
Figure 22:
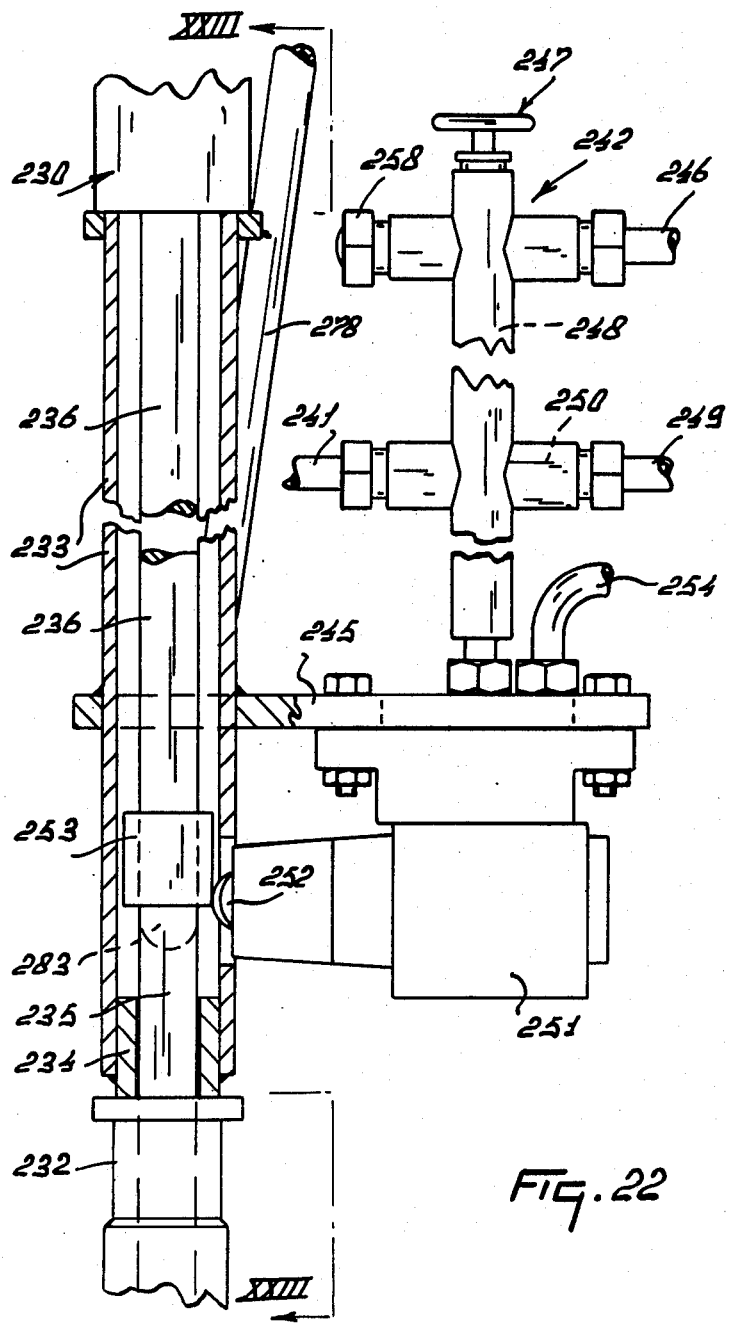
FIG. 22 is partly an elevational view and partly a sectional view of part of the device of FIG. 20 on an enlarged scale.

The carrying arm 217 is provided on both sides with a carrying bracket 262 and 263 respretively, each of which is provided with a grip hook 264, as is shown for the bracket 262 in FIG. 20.

The length of pipe 212 is provided with a jaw 265 diverging away from the pipe portion 212.

The support 215 is provided with an upwardly extending visor carrier 269. The visor carrier 269 extends beyond the hopper, viewed in the direction of length of the hopper. The visor carrier 269 extends upwardly to an extent such that it projects over a distance 270 above the top side of the hopper 1. At the top of the visor carrier 269 is arranged a horizontal arm 271 as a visor indicator. The spreading member 216 together with the coupling device 264 is coupled through the lever arm 221 with only one indicating member 272 formed by a rigid rod. The lower end of the indicating member 272 is coupled through a pivotal shaft 273 with a strip 274 rigidly secured to the lever arm 221. The indicating member 272 extends upwardly away from the lever arm 221 and is movable in the direction height in a guide 275 fastened to the pointer carrier 269. The indicating member 272 is provided above the guide 275 with a part 276 bent over at right angles and forming an indicator. An indicating member 278 formed by a rigid rod is coupled with the valve stem 235. The valve stem 235 is provided for this purpose with a strip 280 to which is pivoted the lower end of the indicating member 278 by means of a pivotal shaft 279. The strip 280 extends through a slot 283 of the tie piece 233. From the valve stem 235 the indicating member 279 extends upwardly and is also movable in a direction of height in the guide 275. The indicating members 272 and 278 are located in the guide 275 on opposite sides of the pointer carrier 279. The indicating member 278 is bent over at the top end through 90° and the bent-over part constitutes a pointer 281. The pointers 276 and 281 extend on opposite sides of the pointer carrier 269 (FIGS. 25–29), viewed parallel to the longitudinal axis of the hopper 1, in the direction of the arrow 282 in FIG. 20.

The supporting plate 213 is provided with two brackets 285, one lying above the other, in which a stop pin 286 can be arranged as is shown in FIG. 20. The stop in 286 comprises a stop lug 287, which can bear on the upper bracket 285 when the pin 286 is arranged in the brackets 285. The supporting plates 213 and 214 have registering holes 288, the sectional area of which is such that the pin 286 fits therein. The end of the pin 286 located below the stop lug 287 in FIG. 20 has a length such that from the outer side of the plate 213 said part can be inserted into the two holes 288.

The device is particularly intended to charge fluid from storage, to transport the fluid to a different place and, if required, to distribute the fluid. In particular, the device serves to carry manure in a thick- or thin-liquid form. The fluid to be handled can be taken from a collecting pit 291 (FIG. 19) through a feeding conduit or pit hose 290 introduced into said collecting pit 291. The pit hose 290 can be simply and readily connected with the inlet 2 from the driver seat of the tractor to which the device is hitched by means of the coupling mechanism arranged on the rear side of the hopper and formed by the arm 217, the member 222, the gas spring cylinder 230 and the system 242. To this end the pit hose 290 is provided on both sides with brackets 292 having supporting rods 293, by means of which the pit conduit is resiliently supported and adjustable in a direction of height on a frame 294. The frame 294 is preferably provided with a direction indicator 295, which can co-operate with a direction indicating pin 296 arranged on the hopper 1. When the device is driven into proximity of the pit 291, the pit conduit 290 has to be captured in the jaw 265. In order to allow maneuvering of the device so that the capturing jaw 265 will grip the opening of the pit conduit 290, the tractor driver can pass the direction indicating pin 296 observable from the driver seat into the vicinity of the direction indicator 295 (FIG. 20). The position of the pin 296 near the indicator 295 is indicative the safe establishment of the connection between the capturing jaw 295 and the pit conduit 290 when the device is driven to the rear.

Figure 19:
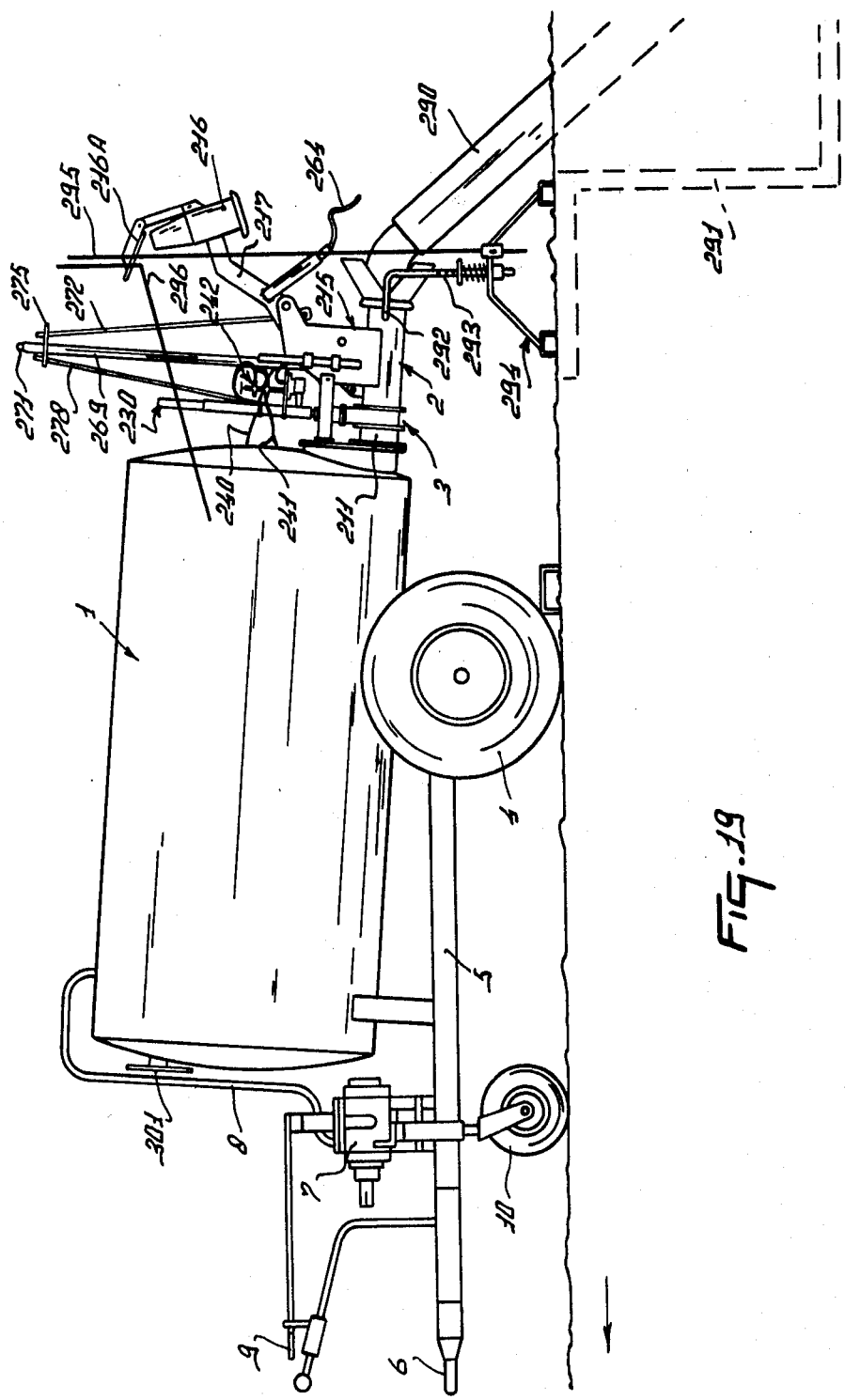
FIG. 19 is a side elevation of a device embodying the invention.
Figure 25:
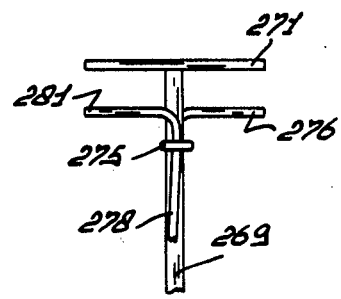
FIG. 25 shows a position of the indicating members for a given position of the various parts of the device.
Figure 26:
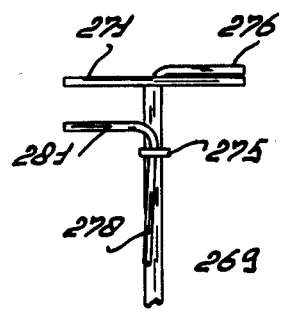
FIG. 26 shows a position of the indicating members for a different position of the various parts of the device.
Figure 27:
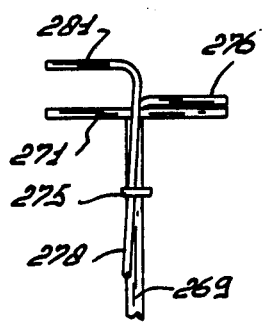
FIG. 27 shows a further position of the indicating members.
Figure 28:
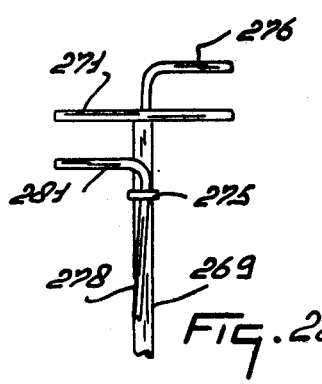
FIG. 28 shows a position of the indicating members for a further position of the various parts of the device.

The connection of the pit conduit 290 with the inlet 2 starts from the position shown in FIG. 19, in which the pit conduit 290 is slipped into the capturing jaw 265. In this position the closing member 3 is closed by the pressure of the gas spring 230, while the spreading member 216 with the grip hook 264 is in the position shown in FIG. 19. The closed position of the closing member and the position of the spreading member 216 and the grip hook 264 shown in FIG. 19 can be read from the positions of the pointers 276 and 281 with respect to the pointer arm 271 as is illustrated in FIG. 25. Since the pointer arm 271 and the indicators 276 and 281 extend over a given distance above the hopper, the tractor driver can constantly see the pointer arm 271 and the indicators 276 and 281. The distance 270 may be chosen in accordance with the size of the hopper so that the indicators 276 and 281 can be observed, for example, from the tractor driver seat. Out of the position shown in FIG. 19 the supporting arm 217 and hence the grip hooks 264 are turned about the pivotal shaft 220. This turn can be performed by introducing fluid into the cylinder 225 through the duct 256 (FIGS. 20 and 24). The fluid is introduced into the duct 256 from the connecting duct 241 via the valve housing 251, the duct 254 and the controlled non-return valve 255. In the position shown in FIG. 19 the valve housing 251 is open between the ducts 241 and 254. The piston rod 224 is then pushed out of the cylinders 225 so that the lever arm 221 and hence the arm 217 with the grip hooks 264 will turn in the direction of the arrow 297. The grip hooks 264 then come into contact with the brackets 292, as a result of which the pit conduit 290 is pressed against the opening of the inlet pipe 212 and clamped to it. The grip hook 264 can then no longer move farther in the direction of the arrow 297 so that also the piston rod 224 cannot be pressed farther out of the cylinder 225. By the turn of the lever arm about the shaft 220 the indicating member 272 moves upwards into the position shown in FIG. 26. This position of the indicator 276 indicates that the pit conduit 290 is clamped to the inlet. The pressure of the fluid fed via the duct 241 will then increase. The excess pressure valve 248 is set so that it will not open until hook 264 is pressing the pit conduit 290 against the inlet 2 with adequate force. Valve 248 is then opened so that fluid can flow through the valve housing 244 and the duct 246 into the gas spring cylinder 230. As a result the rod 236 will move in the cylinder of the gas spring and the valve stem 235 will be drawn out so that the closing member 3 opens. The indicating member 278 will move upwards with the rod 235, the position of the indicator 281 of FIG. 27 then indicating that the member is opened to the connected pit conduit 290. At a movement of the valve stem 235 to an extent such that the closing member opens, the stop 253 of the lug 252 will move away from the latter so that it can again move for automatically closing the valve 251. Then the fluid cannot flow back from the cylinder 225 through the duct 254 and the position of the grip hook 264 clamping the pit conduit 215 is then locked up.

When the pump 7 is actuated at this instant or earlier, said pump being linked to the power take-off shaft through an auxiliary shaft, air can be sucked out of the hopper 1 upon connection of the conduit 8 via the setting arm 9 with the suction side of the pump. By withdrawing air from the hopper the material will flow through the pit conduit 290 and the inlet 2 into the hopper. When the hopper is filled, the closing member 3 has to be closed, while the withdrawal of air from the hopper has to be stopped by blocking the suction side of the pump via the setting arm 9 against the duct 8. The closing member 3 can be closed by releasing the pressure from duct 241, which can be performed through the control-mechanism 243 on the tractor. By the action of the gas spring 230 the piston located therein will be pushed back and the rod 236 will displace the valve stem 235 so that the closing member 3 is closed. The fluid of the gas spring cylinder can flow back to the duct 241 through the non-return valve 250. At the instant of closure of the closing member 3 the stop 253 again comes into contact with the control-lug 252 so that the valve 251 is re-opened. Owing to the presence of the non-return valve 255 no fluid can as yet flow out of the cylinder 225 and the piston rod 224 will remain with respect to the cylinder 225 in the position reached for clamping the pit conduit 290 to the inlet 2. The non-return valve 255 serves to maintain the pressure in the cylinder 225 when the piston rod 224 is out. The pit conduit 290 can then be disengaged by feeding fluid through the duct 240 to the cylinder 225 so that the piston rod 224 is pushed back into the cylinder 225. The pressure in the duct 240 will open the controlled non-return valve 255 via the duct 257 so that the fluid can be pressed out of the cylinder 225 to the tractor through the ducts 254 and 241. As a result the arm 217 and hence the hook 264 will turn about the pivotal shaft 222 in a direction opposite the direction of the arrow 297. By the downward movement of the rod 235 the indicating member 278 with the pointer 281 has moved downwards. During its turn backwards the arm 217 has moved downwards the indicating member 272 with the pointer 276 so that the indicators are again in the position shown in FIG. 25, which is associated with the closure of the closing member 3 and the position of the coupling device 264 shown in FIG. 20.

Figure 29:
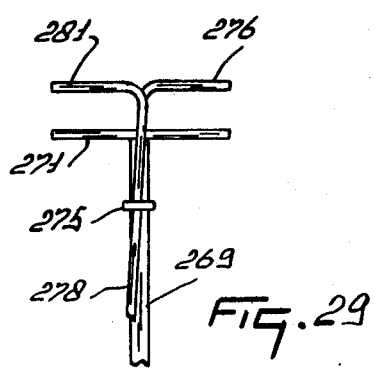
FIG. 29 shows a position of the indicating members for a further different position of the various parts of the device.

When the material has been transported by the device to the place of destination, it can be pressed out of the hopper by pumping air into the hopper by means of the pump 7, for which purpose the pressure side of the pump has to be connected with the hopper and the duct 8 by means of the setting arm 9. For conducting the material out of the hopper the closing member 3, which is kept shut during transport, has to be opened. In order to deliver the material through the spreading device 216 the latter has to be moved in front of the pipe portion 212 so that the material pressed out of the outlet 2 can be spread through the spreading device 216 and the spreading plate 216A. The spreading device 216 is moved out of the position shown in FIG. 20 to the opening of the pipe 212 by turning the arm 217 about the pivotal shaft 220 in the direction of the arrow 297. To this end fluid is again fed into the cylinder 225 through the duct 241 as described above for turning the grip hooks 264. The grip hooks 264 can move to the sides of the inlet 2, since the pit conduit 290 with the brackets 292 is not present near the inlet 2. When the spreading device 216 is urged against the opening of the pipe portion 212 the indicator 276 gets into the position shown in FIG. 28. In this position the closing member 3 is still closed, which is indicated by the indicator 281 in the position shown in FIG. 28. After the spreading device 216 is connected with the inlet 2, the piston rod 224 cannot be urged farther out of the cylinder 225 and the pressure in the duct 241 will increase so that the valve 248 is opened and the fluid can flow into the gas spring cylinder 230, the closing member 3 thus being opened. The stop 253 will leave the lug 252 and the valve 251 is closed so that the spreading device 216 is retained at the outlet 2. The opened position of the closing member 3 and the contact with the spreading device are indicated by the indicators 276 and 281 as is illustrated in FIG. 29. From this working position for spreading the material the closing member 3 can again be closed and the spreading device 216 can again be returned to the position shown in FIG. 20 by removing the pressure from the duct 241 and feeding fluid into the duct 240 in the manner described above.

In order to avoid full transfer of the forces exerted on the pipe portion 212 by the weight of the coupling device and the forces required for connecting the pit conduit or the spreading device with the inlet, via the connection of the pipe portion 212 via the closing member 3 and the pipe portion 211 to the hopper, the supporting strips 261 are provided to constitute together with the parts 211, 3 and 212 a rigid connection between the coupling device and the hopper so that the connections of the parts 211, 3 and 212 with one another and with the hopper are not unduly loaded. An undesirable load might result in gaps in the connections of these parts so that leakage could occur.

Figure 30:
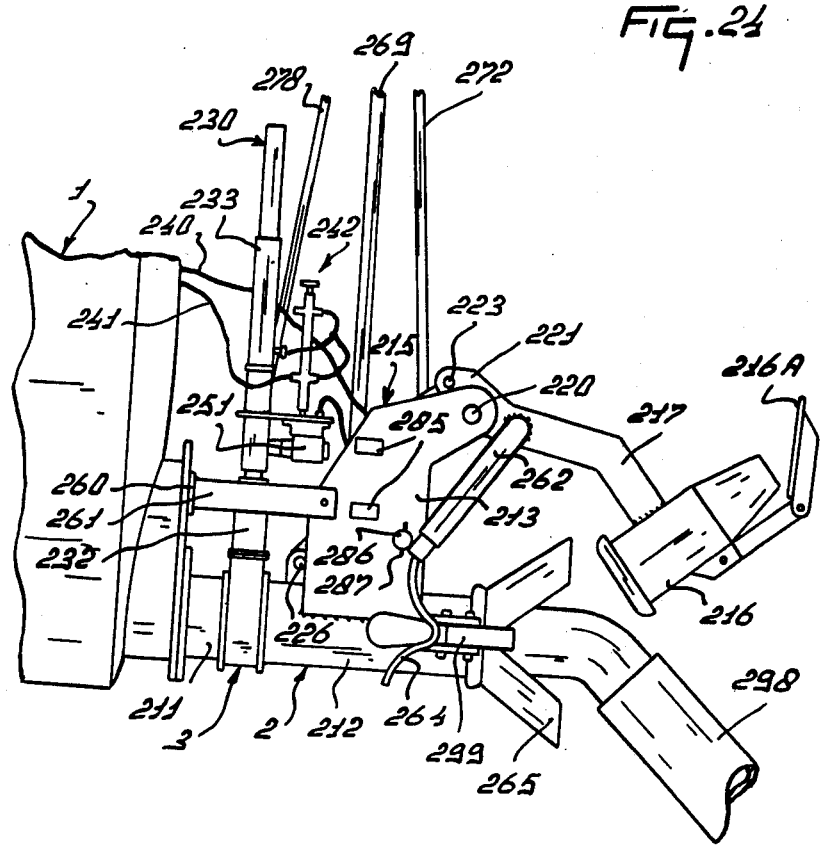
FIG. 30 is an elevational view corresponding with that of FIG. 20 of the device embodying the invention, in which a feeding conduit with manually operable coupling is arranged.

The coupling mechanism shown in FIGS. 19 to 29 may also be used when a pit conduit is to be joined to the inlet 2, which conduit is not provided with the brackets 292 co-operating with the grabs 264. FIG. 30 shows an embodiment of a pit conduit 298 provided with manually operable clamping brackets 299. By means of these clamping brackets 299 the pit conduit 298 can be manually fastened to the opening of the pipe portion 212. In order to have a stop for the grabs 264 so that the rod 224 cannot be urged too far out of the cylinder 225, the stop pin 286 can be used. This pin 286 can be inserted into the holes 288 after having taken it out of the supporting brackets 285. When the pin 286 is located in the holes 288, the bracket 262 comes into contact with the stop end 300 of the pin 286 during its movement in the direction of the arrow 297. Thus the pin 286 constitutes a stop for the bracket 262 so that a terminal position of the grabs 264 is obtained, which at least substantially corresponds with a terminal position in which the pit conduit 290 with the brackets 292 is connected with the inlet. When the position of the brackets 262 at the stop 286 is reached, the process is the same as described above after the pit conduit 298 is pressed against the inlet 212. The stop pin 286 can be inserted into the holes 288 to an extent such that the lug 287 comes into contact with the supporting plate 213. The top end 300 of the stop pin shown in FIG. 20 constitutes the stop arresting the bracket 262 in the position shown in FIG. 30.

The structure shown in the Figures provides a coupling device by which a pit conduit and/or a spreading member can be brought in a simple manner into contact with the inlet or outlet 2 respectively. THe closing member 3 is actuated in the desired manner in accordance with the position of the pit conduit or the spreading member. This actuation can be readily performed by the driver from his seat of the tractor, the positions of the various members being checked by the positions of the indicators 276 and 281 with respect to the indicating rod 271 as described in the foregoing and as illustrated in FIGS. 25 to 29. The images shown in FIGS. 25 to 29 may be displayed on an indication panel 301 arranged, for example, at the front of the hopper, it being written on said panel what are meaning the various relative positions of the indicators 276 and 281 with respect to the visor carrier 271 and the positions of the coupling device, the spreading member and the closing member.

The construction shown provides a strong coupling device which ensures an effective use in practice.

Although various features of the spreaders described and illustrated, will be set forth in the following claims as inventive features, it is to be noted that the invention is not necessarily limited to these features and may encompass all novel and inventive features disclosed both individually and in various combinations.

Having disclosed our invention, what we claim as new and to be secured by Letters Patent of the United States is:

1. A device for transporting and/or spreading fluids comprising a hopper and a conduit therefrom with a valve in said conduit and an opening after said valve through which fluids can be passed into or out of said hopper, displaceable coupling means adjacent said opening, said coupling means including linkage means which are constructed and arranged selectively to engage or disengage either a fluid supply connector or fluid distributor means carried by said linkage means on or from said opening to open said valve only when said opening is so engaged and to close said valve before said opening is so disengaged, said valve being automatically operated to be opened by said coupling means responsive to said linkage means positioning said fluid supply connector or said fluid distributor means on said opening, said supply connector and said distributor means being automatically disengaged by said linkage means responsive to said coupling means closing said valve.

2. A device as claimed in claim 1, in which said hopper has a frame and hitch means on said frame for hitching the equipment to a vehicle.

3. A device as claimed in claim 2, in which said coupling means is operable from the vehicle.

4. A device as claimed in claim 1, in which said connector is fixed in position relative to said distributor means.

5. A device as claimed in claim 4, in which said connector and said distributor means are pivotable together by said linkage means about a pivotal axis which extends horizontal and transverse to the norma direction of travel.

6. A device as claimed in claim 5, in which said pivotal axis is located above said opening.

7. A device as claimed in claim 5, in which a support extends upwardly from said conduit and mounts a pivotal shaft that defines the pivotal axis.

8. A device as claimed in claim 5, in which said coupling means and said distributor means are located to the rear of said valve.

9. A device as claimed in claim 5, in which said coupling means is located between said valve and said distributor means.

10. A device as claimed in claim 5, in which said linkage means comprises a hydraulic actuator and a mechanical linkage that interconnects said connector with said distributor means.

11. A device as claimed in claim 10, in which said actuator is connected with a duct system for remote-control of the actuator by an operator, said actuator comprising a double-acting cylinder and piston unit.

12. A device as claimed in claim 11, in which said mechanical linkage includes an arm that interconnects said connector and said distributor means, whereby displacement of said piston turns said connector and said distributor means about said pivotal axis.

13. A device as claimed in claim 11, in which said actuator is pivoted to a rocker of said mechanical linkage and said rocker is pivotable about a horizontal axis, said rocker being pivotally linked with an upwardly directed arm and that arm being pivotally connected to a lever which operates said valve, whereby said valve is opened and shut by said unit.

14. A device as claimed in claim 13, in which said valve is biassed towards its shut position by a spring, said spring interconnecting said lever to a fixed point on said coupling means.

15. A device as claimed in claim 14, in which one end of said lever raises and lowers said valve responsive to the movement of said piston, said distributor means being pivoted together with said connector so that said valve is raised open when either said distributor means or said connector is coupled to said conduit.

16. A device as claimed in claim 11, in which said actuator is coupled with a further hydraulic actuator that operates said valve, the two hydraulic actuators being inter-coupled so that said actuator for said valve can open said valve only when said connector or said distributor means engages said opening.

17. A device as claimed in claim 5, in which said coupling means is located substantially centrally relative to said conduit and supported by the same.

18. A device as claimed in claim 5, in which said coupling means is connected to an indicating device that indicates said position of said conduit relative to said connector or distributor means as well as said condition of said valve.

19. A device as claimed in claim 18, in which said indicating member has a single connection with said coupling means, said distributor means and said valve.

20. A device as claimed in claim 5, in which said linkage means and said distributor means are fixed at an angle to one another.

21. A device as claimed in claim 5, in which said linkage means comprises two parts which are located on opposite sides of said conduit and said parts being movable perpendicular to said plane of said opening for connecting and disconnecting said supply connector to and from said conduit.

22. A device as claimed in claim 21, in which said linkage means comprises grabs by which said connector can be drawn against the conduit, each said grab comprising jaw means that cooperate with protruding parts of said connector.

23. A device as claimed in claim 22, in which each said grab comprises a V-shaped capturing jaw.

24. A device as claimed in claim 23, comprising a guide member adjacent said opening for capturing and guiding said connector, said guide member comprising a plurality of cone segments arranged around the opening and separated from one another by recesses.

25. A device as claimed in claim 24, in which said recesses are arranged at the sides of said conduit.

26. A device as claimed in claim 1, in which said supply connector is part of a supply conduit and is supported by a separate frame that is spaced apart from said hopper.

27. A device as claimed in claim 26, in which said supply conduit is resiliently mounted on the separate frame and the latter is stationary on the ground adjacent a fluid supply pit.

28. A device as claimed in claim 27, in which said separate frame affords a support that extends around said conduit.

29. A device as claimed in claim 28, in which said separate frame is a circular ring that holds said supply conduit suspended with springs, said separate frame having feet and means vertically adjusting the distance between the ground and said separate frame.

30. A device as claimed in claim 27, in which said hopper is mounted on wheels and guide members are positioned to guide said wheels, whereby said opening can be maneuvered adjacent the supply conduit connector.

31. A device as claimed in claim 26, in which said separate frame mounts a direction indicator that extends upwardly to an operator in moving said conduit adjacent said supply conduit.

32. A device as claimed in claim 31, in which said hopper has a wheeled frame and a direction pin on the hopper co-operates with the direction indicator that extends upwardly from the ground.

33. A device for transporting and/or spreading fluids comprising a hopper and a pipe conduit leading into the hopper, means for pumping fluids into or out of the hopper via said conduit, said conduit terminating in a rear opening and a displaceable valve in said conduit between said opening and said hopper, articulated coupling means supported on said conduit between said opening and said valve for positioning either a fluid supply connector or fluid distributor means on said opening, said coupling means being pivoted to a support on the conduit and said valve being operatively associated with said coupling means by adjusting means which automatically opens and closes said valve during the coupling and uncoupling of said supply connector or distributor means from said opening.

34. A device as claimed in claim 33, in which a joint interconnects said conduit with the hopper and said joint is located substantially higher than said conduit.

35. A device as claimed in claim 34, in which said joint extends substantially parallel to said conduit and comprises a strip arranged between said support and said hopper.

36. A device as claimed in claim 35, in which said support comprises two relatively parallel and spaced apart side plates, each said side plate being fastened by means of a strip to said hopper.

37. A device as claimed in claim 36, in which said strips are arranged in common on a fastening plate connected with said hopper.

38. A device as claimed in claim 33, in which said valve and said conduit are coupled to one another by a screwthreaded joint, said valve being coupled to said hopper by a further screwthreaded joint.

39. A device as claimed in claim 33, in which said coupling means is pivotably movable on a support and said support has a removable stop that co-operates with said coupling means at a terminal position that corresponds with a position of said coupling means, whereby a supply connector can be fastened to said conduit opening, manual means connecting said conduit to said connector.

40. A device as claimed in claim 39, in which said stop can be introduced into and withdrawn from a hole in said support.

41. A device as claimed in claim 40, in which said stop comprises a rod which projects at least partly outside said support to afford said stop.

42. A device as claimed in claim 41, in which said rod comprises a lug which contacts said support when said rod is inserted into said hole.

43. A device as claimed in claim 42, in which said support is provided with brackets in which said rod can be releasably held in inoperative position.

44. A device as claimed in claim 33, in which the coupling means and/or the distributor means and/or the valve are coupled with at least one indicating member at said rear of said hopper, said indicating member projecting beyond the hopper when viewed in a direction parallel to said hopper, whereby said indication member is perceptible by an operator at the front end of said hopper.

45. A device as claimed in claim 44, in which said indication member extends above the top side of said hopper.

46. A device as claimed in claim 44, in which said indication member is formed by rigid rods.

47. A device as claimed in claim 46, in which said rods are vertically movable with respect to a visor indicator rigidly secured to the device.

48. A device as claimed in claim 47, in which said hopper is elongated and said visor indicator is a rod extending outwardly from said hopper's longitudinal axis.

49. A device as claimed in claim 44, in which a single indication member is connected to said coupling means and said distributor means.

50. A device as claimed in claim 49, in which said indication member is coupled to a carrying arm and said arm is adjustably connected to said support for said coupling means.

51. A device as claimed in claim 50, in which said carrying arm is pivotable about a substantially horizontal pivotal shaft and linked to said support.

52. A device as claimed in claim 51, in which said indication member is connected with said carrying arm on the opposite side of said pivotal shaft from said coupling means.

53. A device as claimed in claim 52, in which said valve has a displaceable stem and a second indication member is coupled with said stem.

54. A device as claimed in claim 53, in which said second indication member is vertically movable when said valve stem is displaced.

55. A device as claimed in claim 54, in which both said indication members are movably held in a guide carrier that is rigidly secured to said support.

56. A device as claimed in claim 55, in which one of said indication members is rod-shaped and includes a bent-over end which affords a visible indicator that is movable relative to said visor carrier.

57. A device as claimed in claim 56, in which said visor carrier extends parallel to said bent-over end portion of one said indication member.

58. A device as claimed in claim 57, in which said carrier is located in the middle between the terminal positions of pointers of the two said indication members.

59. A device as claimed in claim 55, in which the two said indication members have upper pointers bent over in opposite directions, said visor carrier comprises an upper rod that extends horizontally over a distance equal to the span of the two said bent-over parts of said pointer members.

60. A device as claimed in claim 33, in which said distributor means and/or said coupling means are pivotably displaceable into operative positions and a hydraulic system controls the movements of such means, said system being associated with said valve to communicate and coordinate said movements of the valve.

61. A device for transporting and/or spreading fluids comprising a hopper and a conduit leading into the hopper, means for pumping fluids into or out of the hopper via said conduit, said conduit terminating in a rear opening and a displaceable valve in said conduit between said opening and the hopper, coupling means supported on said conduit adjacent said valve for positioning either a fluid supply connector or a fluid distributor on the conduit outlet, a pivotal linkage system interconnecting said valve with said coupling means, said valve being sequentially opened and shut responsive to the pivoting of said coupling means, a hydraulic system including respective piston and cylinder units in hydraulic communication with one another via ducts and one-way valves which are arranged and constructed so that a first piston and cylinder of said units adapted is actuated to a limit to pivot said coupling means to connect or disconnect said connector or said distributor before a second piston and cylinder of said units is actuated to operate the valve to an open or closed condition.

62. A device as claimed in claim 61, in which a hydraulic control-mechanism for said valve comprises a gas spring associated with said second piston and cylinder.

63. A device as claimed in claim 62, in which said control-mechanism includes a regulator that communicates with a separate hydraulic system of a vehicle and said hopper is mounted on a frame having means for hitching the device to said frame, said regulator being a hydraulic switch that communicates pressure to said second piston and cylinder following the actuation of said first piston and cylinder.

64. A device as claimed in claim 63, in which said regulator comprises two joints that can be coupled with the separate hydraulic system of said vehicle, a first of said joints being coupled with said gas spring through an excess pressure valve and a non-return valve.

65. A device as claimed in claim 64, in which said first joint is coupled through a control-valve and a controlled non-return valve with said first piston and cylinder for said coupling means.

66. A device as claimed in claim 65, in which said control-valve co-operates and is coupled with said second piston and cylinder, whereby by shutting or opening said valve the control-valve is actuated.

67. A device as claimed in claim 66, in which the second of said joints is coupled with said hydraulic system portion that includes said first piston and cylinder.

68. A device as claimed in claim 67, in which said second joint is coupled through an intermediate connection with the controllable non-return valve of said first joint.

* * * * *